United States Patent [19]

Henry et al.

[11] 4,215,396

[45] Jul. 29, 1980

[54] INTELLIGENT PROGRAMMABLE PROCESS CONTROL SYSTEM

[75] Inventors: Raymond W. Henry, Dallas; Bobby G. Burkett, Richardson; Michael L. Bunyard, Lubbock, all of Tex.

[73] Assignee: Texas Instruments Incorporated, Dallas, Tex.

[21] Appl. No.: 936,538

[22] Filed: Aug. 24, 1978

[51] Int. Cl.² .................. G06F 15/16; G06F 15/46
[52] U.S. Cl. .................. 364/101; 364/200; 364/103
[58] Field of Search .......... 364/100, 101, 102, 103, 364/107, 120, 474, 200 MS File, 900 MS File

[56] References Cited

U.S. PATENT DOCUMENTS

| | | | |
|---|---|---|---|
| 3,810,104 | 5/1974 | Markley | 364/104 X |
| 3,959,775 | 5/1976 | Valassis et al. | 364/200 |
| 4,029,950 | 6/1977 | Haga | 364/104 |
| 4,034,354 | 7/1977 | Simmons | 364/104 X |
| 4,058,711 | 11/1977 | Ondercin et al. | 364/101 |
| 4,064,395 | 12/1977 | Schubeller et al. | 364/107 |
| 4,118,771 | 10/1978 | Pomella et al. | 364/101 |
| 4,149,235 | 4/1979 | Froyd et al. | 364/107 X |

*Primary Examiner*—Joseph F. Ruggiero
*Attorney, Agent, or Firm*—Andrew M. Hassell; Rene' E. Grossman; Stephen S. Sadacca

[57] ABSTRACT

An intelligent programmable process control system for controlling industrial processing and manufacturing equipment and the like utilizes a unique system of cooperating multiple processors. A digital processor is utilized for controlling the analog portion of the processing equipment, and a boolean processor is utilized for sequencing and controlling the on/off states of controllable devices. Along the process communication means is provided for communications between the processors. In one embodiment, a circuit is provided for accomplishing parallel digital I/O, accessible by the digital processor for additional control of the analog processing equipment.

6 Claims, 17 Drawing Figures

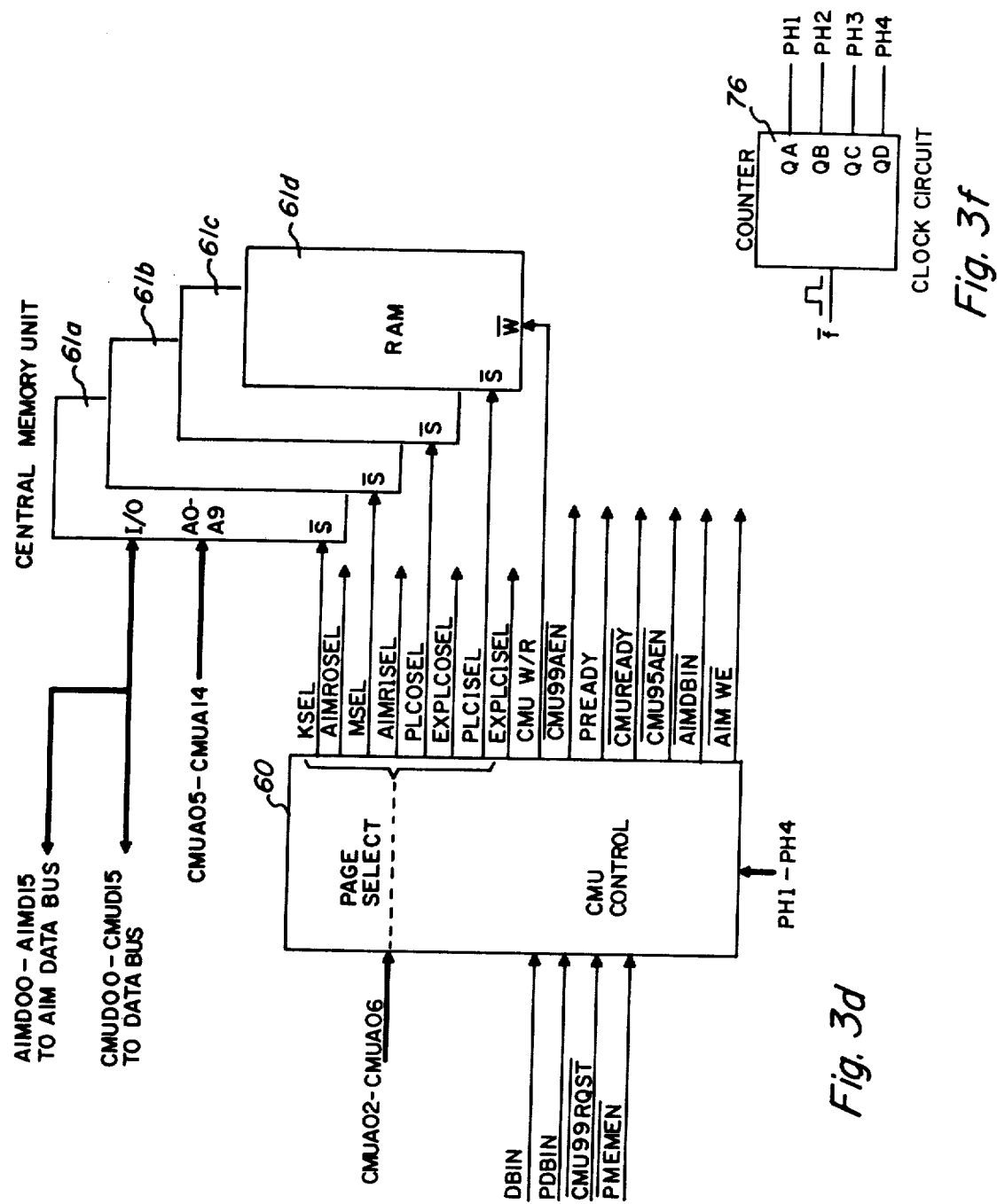

CMU CONTROL UNIT 60

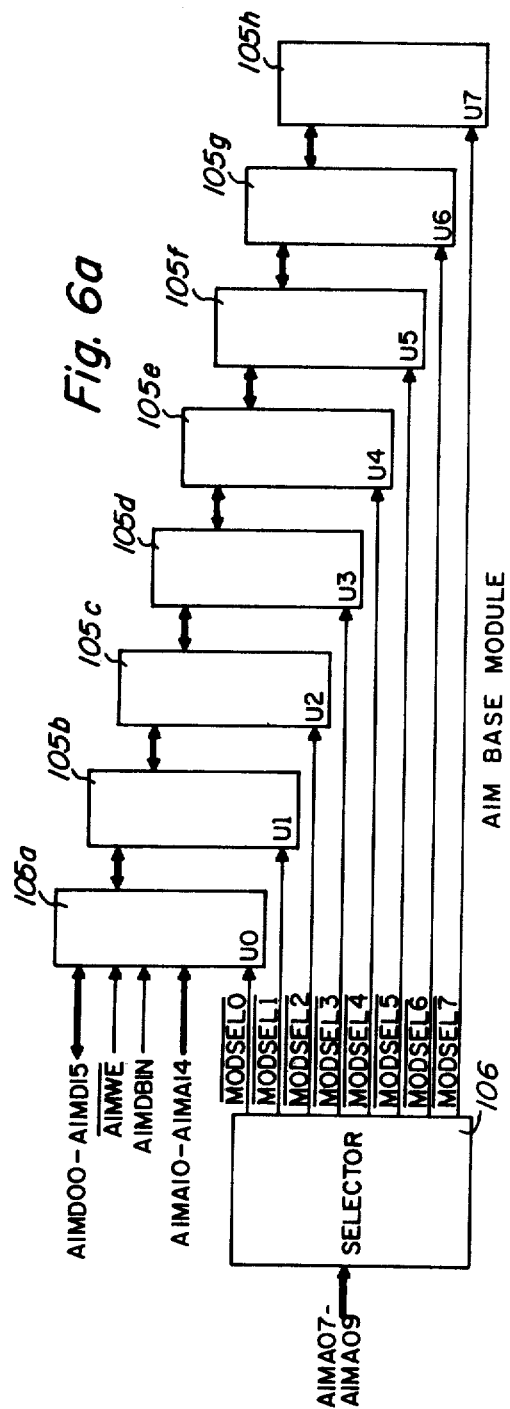
Fig. 6a
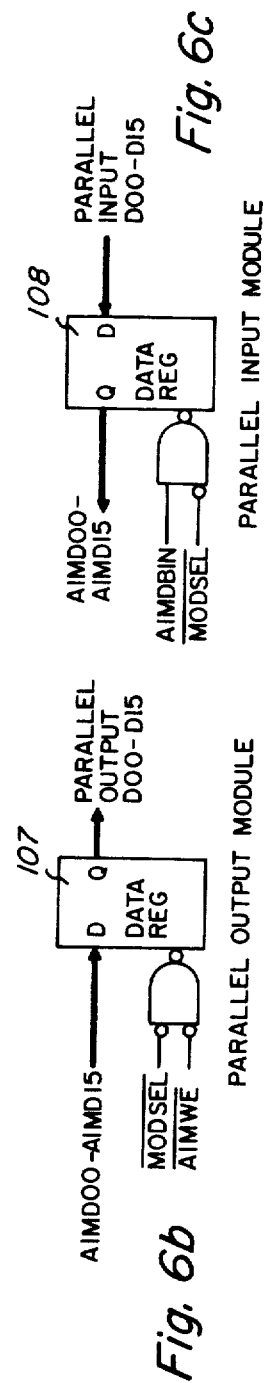
Fig. 6c
Fig. 6b

INTELLIGENT PROGRAMMABLE PROCESS CONTROL SYSTEM

BACKGROUND OF THE INVENTION

This invention relates to process controllers and more particularly to an intelligent programmable process control system.

Process controllers have been utilized in recent years for controlling processing machines and manufacturing lines and the like. The systems operate on boolean logic which is programmed into the controller by means of a stored program supplied by the user. The program may be stored in a permanent or removable read-only memory (ROM) to control a particular process or machine in the same manner continuously (or until a new ROM is supplied) or, the program may be stored in a random access memory (RAM) which program may be changed at will. The industrial process controller, following the stored set of boolean equations receives inputs from sensors (photodiodes, pressure switches, etc.) located throughout the processing or manufacturing equipment as well as inputs from timers, etc., and in response thereto, generates signals for controlling the various operating devices of the processing or manufacturing equipment such as solenoids, motors, valves, etc. See, for example, U.S. Patents to Henry et al (U.S. Pat. No. 3,938,104) "System for Modifying a Logic Controller Instruction Set"; Naud (U.S. Pat. No. 3,924,242) "System for Building Op Codes"; Burkett et al (U.S. Pat. No. 3,953,834) "Programmable Logic Controller With Push Down Stack" Burkett et al (U.S. Pat. No. 4,030,080) "Variable Module Memory"; Burkett et al (U.S. Pat. No. 4,092,730) "Data Processor With Read Only Memory Processor and Partial Solution Push-Down Stack"; and, Burkett et al (U.S. Pat. No. 3,982,230) "Programmable Logic Controller With Flag Storage", each being assigned to the assignee of the present invention, as well as the prior art of record with respect to each of said patents. These process control systems are all hard-wired logic systems.

With the recent widespread commercialization of the microprocessor, the ability of replacing the hard-wired logic of industrial controllers with a microprocessor has greatly simplified the circuitry of the industrial controller as well as provided a degree of "intelligence", the ability of the controller not only to control process parameters, but also to mathematically compute parameters as well.

The present invention has gone many steps further in increasing the ability and efficiency of a microprocessor-based intelligent process controller.

It is therefore an object of the present invention to provide an improved intelligent programmable process control system.

Another object of the present invention is to provide a microprocessor-based process control system with intelligent parameter computation ability as well as boolean logic parameter control.

It is another object of the invention to provide an improved process controller with both analog and digital input/output capability.

It is still a further object of the invention to provide a process controller with a capability of making complex mathematical computations.

Yet another object of the present invention is to provide a process controller with multiple process control loops.

Still another object of the invention is to provide an improved process controller having each of the above features in one compact system.

BRIEF DESCRIPTION OF THE INVENTION

These and other objects are accomplished in accordance with the present invention in which an intelligent programmable process control system includes a uniquely configured pair of cooperating microprocessors. A first multi-bit control microprocessor is utilized for computation and for sensing and controlling the analog portion of the processing equipment, and a second single-bit microprocessor is utilized for sequencing and for sensing and controlling the states of on-off devices. The control microprocessor has overall supervisory control. An arbitration circuit for resolving simultaneous or phased access to memory by the two microprocessors is provided. In addition, a circuit is provided for accomplishing parallel digital input/output operations and analog input/output operations, again accessible by both microprocessors. In one embodiment, means for linking arithmetic functions and non-arithmetic (logic) functions within a boolean-type instruction set is provided. This allows a process on/off state to be controlled, for example, in accordance with computed statistical criteria.

BRIEF DESCRIPTION OF THE DRAWINGS

Still further objects and advantages of the invention will become apparent from the detailed description and claims when read in conjunction with the accompanying drawings in which:

FIGS. 3a-3f are logic circuit diagrams of the sequencer module of FIG. 1.

FIGS. 6a-6e are logic circuit diagrams of the AIM (auxiliary input output module) I/O system of FIGS. 1 and 2.

DETAILED DESCRIPTION OF PREFERRED EMBODIMENTS

Figure 1:
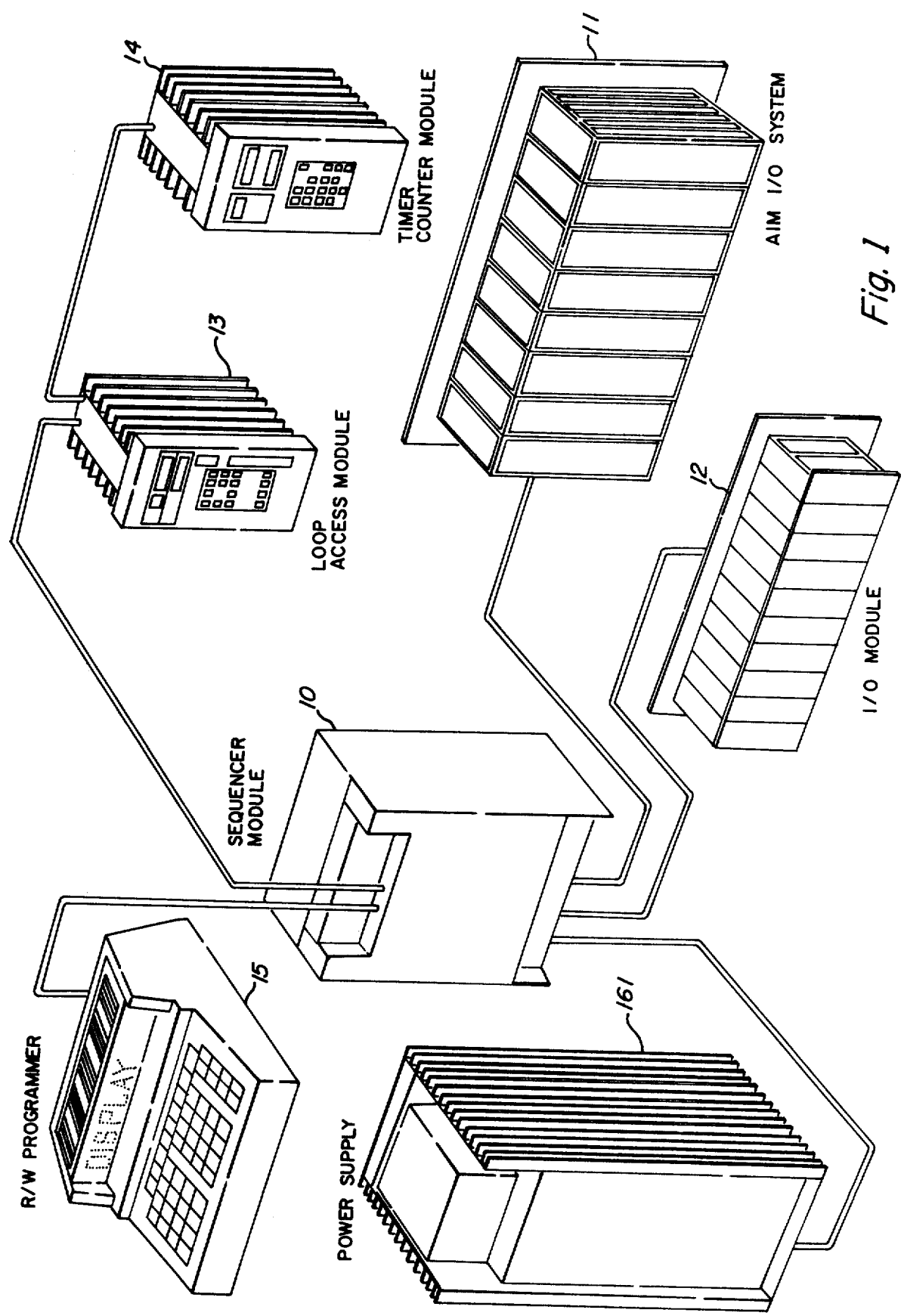
FIG. 1 is a perspective view of the components comprising one embodiment of an intelligent programmable process control system according to the present invention.

Referring then to the drawings, and particularly to FIG. 1, an intelligent programmable process control system in accordance with the present invention is illustrated. The system is comprised of sequencer module 10 which controls analog loops sensing and controlling of the on/off states of sensors and controlled devices, respectively, located along the process. Analog loop control is accomplished via (AIM) auxiliary input output module (AIM) 11. AIM unit 11 also provides parallel digital inputs and outputs to the system. The single bit on/off states are sensed and controlled by plug-in modules of I/O module 12. Loop access module 13 provides limited input and output capability for control to operator to the analog loop control functions. Timer/counter module 14 provides limited input and output capability for the operator to control a series of process control timers and counter. The major source of data and instruction entry and display for the system is provided by read/write (R/W) programmer module 15. The system is powered by power supply module 161.

Figure 2:
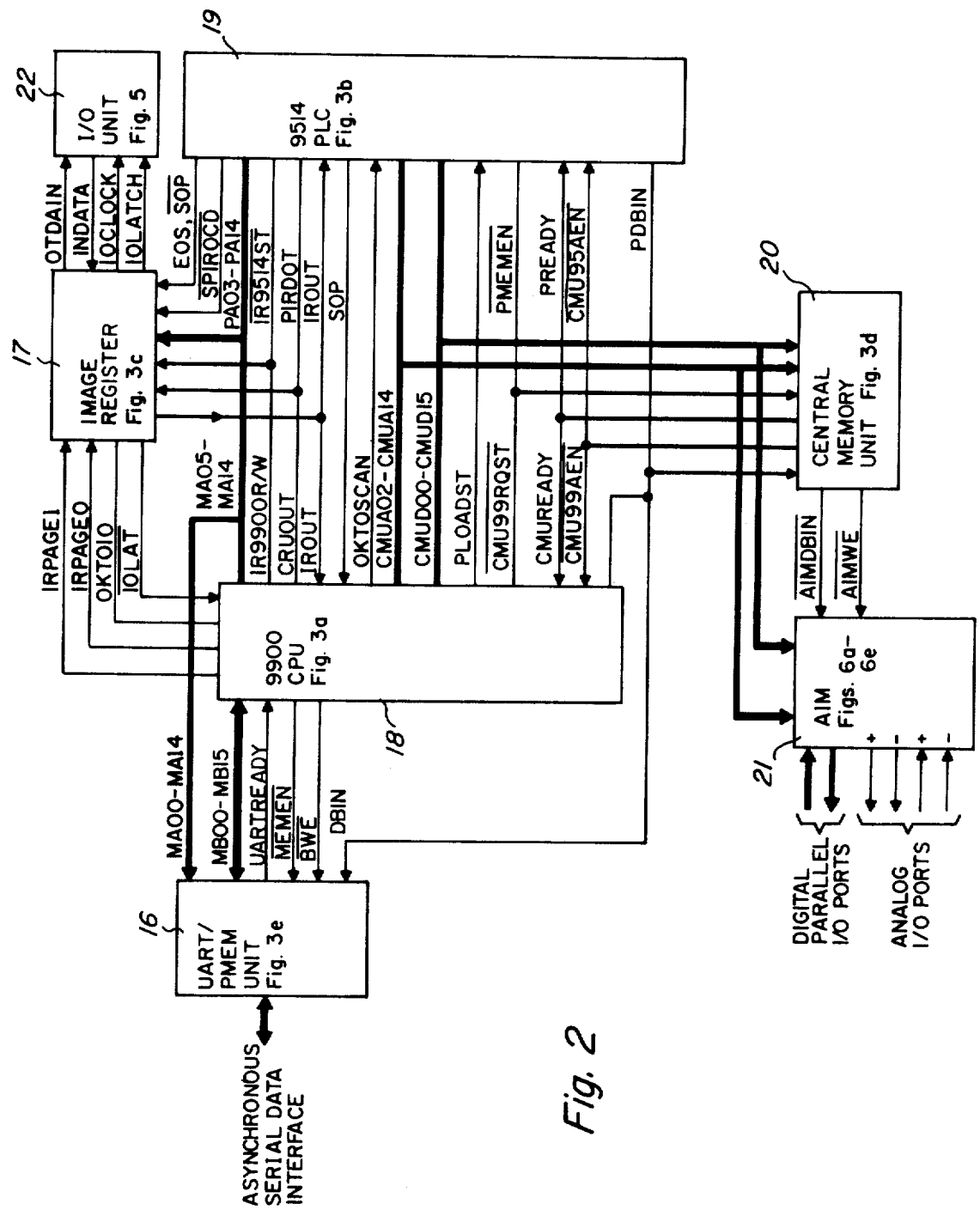
FIG. 2 is a block diagram of the control system of FIG. 1.
Figure 3A:
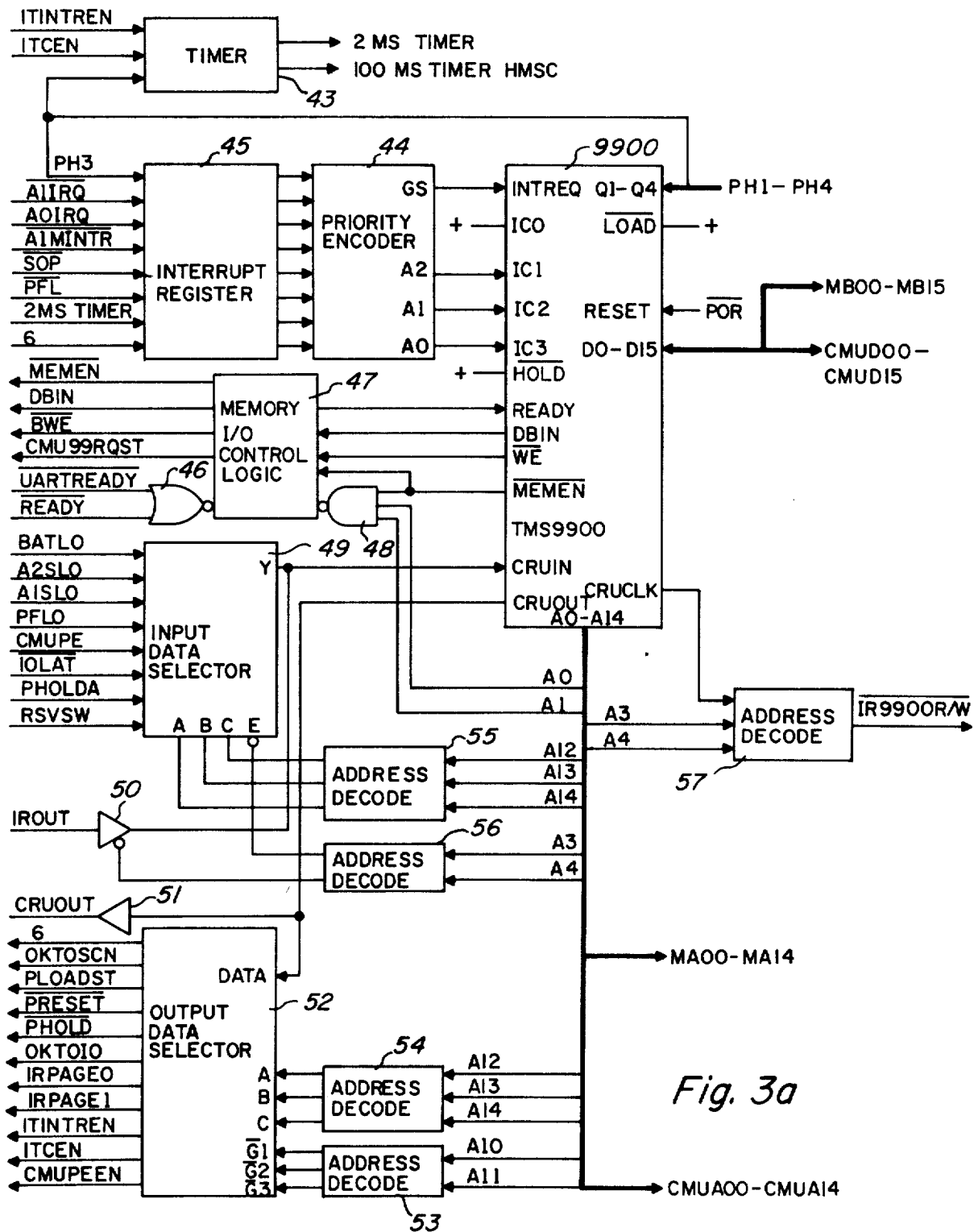
Figure 3B:
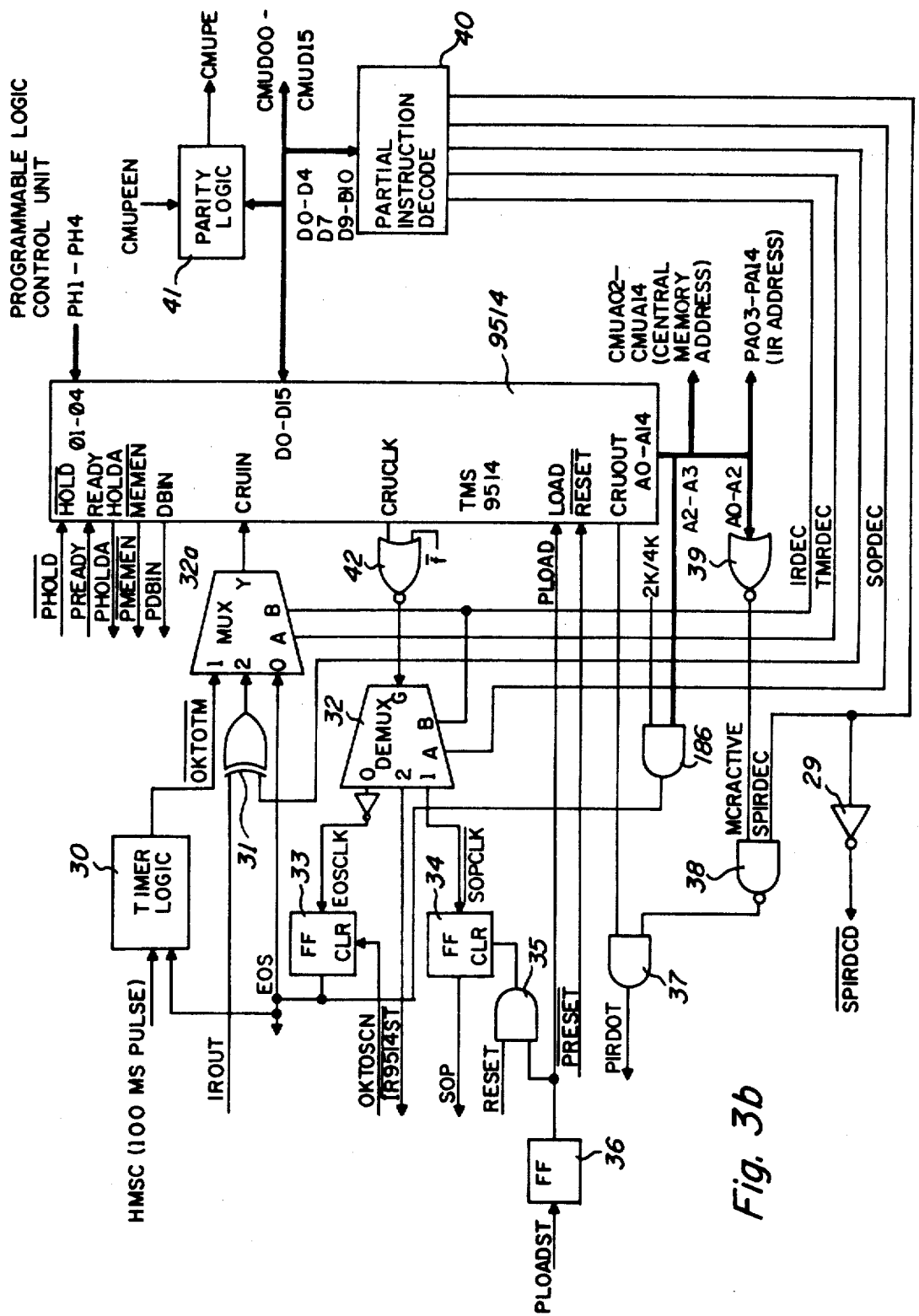

Referring to the block diagram of FIG. 2, sequencer 10 is comprised of 9900 microprocessor based central processing unit (CPU) 18 illustrated in detail in FIG. 3a, 9514 microprocessor based programmable logic control unit (PLC) 19 illustrated in detail in FIG. 3b, image register unit 17 through which the on/off states of the sensed input bits and the on/off states of the controlled output, AIM unit 21 through which analog and digital functions are input and output bits are stored as well as a series of flag bits and memory contained in units 16 and 20. The image register (IR) of image register unit 17 is in effect an image of the serial communications register of I/O unit 22 contained in module 12. I/O unit 22 will henceforth be discussed in detail with respect to FIG. 5. Another unit contained in sequencer module 10 is central memory unit (CMU) 20 which will be discussed in detail with respect to FIG. 3d. Central memory unit 20 provides random access memory for both 9900 CPU 18 and 9514 PLC unit 19 and provides a means of communication between the two microprocessors. UART/PMEM unit 16 provides additional RAM, as well as a large block of ROM memory, for 9900 CPU 18. In addition, UART/PMEM unit 16 provides two asychronous serial data interface ports for communicating with serial devices such as teletype units and the like. UART/PMEM unit 16 is later described in detail with respect to FIG. 3e.

In accordance with a unique feature of the present system, both the 9900 CPU 18 and 9514 PLC 19 access auxiliary input/output module (AIM) 21 as an addressable extension of central memory unit 20. AIM unit 21, which is later described in detail with reference to FIGS. 6a-6e, provides digital parallel I/O ports as well as analog I/O ports which are utilized in conjunction with the analog loop control functions. A priority circuit contained in central memory unit 20 resolves simultaneous or phased accesses of central memory unit 20 and/or AIM unit 21 by microprocessors 18 and 19.

Referring to FIG. 2, 9900 central processor unit 18 and 9514 programmable logic control unit 19, both have access to central memory unit 20. Central memory unit 20 is addressed by a 13 bit address (CMUA02-CMUA14) and data is either transferred into or out of microprocessor 18 or 19 depending upon which of the microprocessors has requested access to memory unit 20 via request signals (CMU99RQST) or (PMEMEN). Simultaneous requests for memory unit 20 and/or AIM unit 21 are handled by an arbitration circuit which will later be discussed in detail with respect to FIG. 4. A data-bus-in flag signal (DBIN or PDBIN) from the requesting microprocessor indicates whether the microprocessor is requesting to read or write information into memory unit 20 and controls the data buses accordingly as well as providing the proper read/write control for the RAM memories. Central memory unit 20 responds to the requesting microprocessor by a ready flag (CMUREADY or PREADY) indicating that the central memory unit is ready to accept or output data to such microprocessor and provides a data bus enable signal (CMU99AEN or CMU95AEN, respectively). The data is then transferred over the 16 bit data bus CMUD00-CMUD15. As discussed above, AIM unit 21 is addressed as extension of central memory unit 20. AIM unit 21 contains, in the present embodiment, eight module plug-in sockets which are addressed as a central memory unit address CMUA03-CMUA14, as if such sockets were 16 bit registers of central memory unit 20. Any combination of digital parallel input units, digital parallel output units, analog input units and analog output units may be plugged into the eight sockets as will later be described in detail with respect to FIGS. 6a-6e. Data is either read into or out of the unit plugged into the addressed socket of AIM unit 21 depending upon flag signals AIMDBIN and AIMWE generated by central memory unit 20 in accordance with the flag signals DBIN and PDBIN provided by the requesting microprocessor. Data is read into or out of AIM unit 21 over data bus CMUD00-CMUD15.

Image register unit 17 is addressed by microprocessor 18 via address bus MA05-MA14 and by microprocessor 19 via address bus PA05-PA14. The IR9900 R/W and IR9514ST flag signals indicate to image register unit 17 whether the 9900 CPU 18 or 9514 PLC 19 is reading from or writing into image register unit 17. The image register unit 17 is controlled by the SOP and EOS flag signals from PLC 19 and the OKTOIO flag signal from 9900 CPU 18. Image register unit 17 is paged by 9900 CPU 18 by IRPAGE1 or IRPAGE0 signal while image register unit 17 is paged by 9514 PCU 19 by address signals PA03 and PA04. The states of IRPAGE1 and IRPAGE0 or PA03 and PA04 determine which of four 1024 bit pages of the image register is being addressed.

Data is transferred one bit at a time from image register unit 17 to CPU 18 or PLC unit 19 via IROUT. Data is selectively transferred from CPU 18 via CRUOUT and from PCU unit 19 via PIRDOT into image register unit 17. Data is also transferred serially between image register unit 17 and I/O unit 22. The on/off states of the sensor devices along the process being controlled are thus transferred to the image register and the on/off states of controlled devices along the process being controlled and transferred from the image register. Data is transferred from image register unit 17 via OTDAIN to I/O unit 22 and data is transferred from I/O unit 22 to image register unit 17 via INDATA as controlled by the IOLATCH flag signal and the IOCLOCK clock signal generated by image register unit 17.

UART/PMEM unit 16 is addressed by address signals from CPU 18 on address bus MA00-MA14. The MEMEN flag signal requests access to memory unit 16 and the BWE Flag signal indicates whether the operation is a read or write. When memory unit 16 is ready for data transfer, this is indicated by the UARTREADY flag signal to CPU 18 and data is then transferred over 16 bit data bus MB00-MB15.

With reference to FIGS. 3a-3f, units 16-20 comprising sequencer module 10 will now be described in detail. Referring then to FIG. 3a, 9900 contral processing unit 18 is shown in detail. CPU 18 is comprised of a TMS9900 microprocessor (9900) manufactured and sold as a standard product by Texas Instruments Incorporated, assignor of the present invention. The TMS9900 microprocessor, which is a 16 bit microprocessor, is widely used in industry and described in detail in the product data sheet available from Texas Instruments Incorporated.

The input and output terminals of the TMS 9900 chip are described in Table I below.

TABLE I

TMS 9900/TMS 9514 TERMINALS

| | |
|---|---|
| D0–D15 | DATA BUS |
| A0–A14 | ADDRESS BUS |
| DBIN | INDICATES DATA BUS SET TO READ DATA IN |
| MEMEN | INDICATES A MEMORY CELL REQUEST |
| WE | INDICATES DATA AVAILABLE TO BE WRITTEN IN MEMORY |
| CRUCLK | COMMUNICATIONS REGISTER UNIT CLOCK SIGNAL INDICATES DATA TO BE SAMPLED ON CRUOUT OR A0-A2 |
| CRUIN | COMMUNICATIONS REGISTER UNIT DATA IN - MAY BE WRITTEN IN CRU BIT SPECIFIED BY A3-A14 |
| CRUOUT | SERIAL OUTPUT DATA |
| INTREQ | INTERRUPT REQUEST |
| IC0–IC3 | INTERRUPT PRIORITY CODE - SAMPLED DURING INTERRUPT REQUEST TO DETERMINE IF HIGH ENOUGH PRIORITY TO BE ACCEPTED FOR INTERRUPT |
| HOLD | WHEN ACTIVATED, INDICATES TO PROCESSOR THAT EXTERNAL DEVICE DESIRES TO TRANSFER DATA TO/FROM MEMORY VIA PROCESSOR BUSES |
| HOLDA | INDICATES PROCESSOR IS IN HOLD STATE FOR TRANSFER OF DATA TO/FROM MEMORY BY REQUESTING DEVICE |
| READY | INDICATES TO PROCESSOR THAT MEMORY READY TO READ READ/WRITE DATA ON NEXT CLOCK CYCLE |
| WAIT | INDICATES THAT PROCESSOR WAITING FOR READY CONDITION FROM MEMORY |
| IAQ | INDICATES PROCESSOR IS RECEIVING AN INSTRUCTION FROM MEMORY |
| LOAD | WHEN ACTIVATED, CAUSES PROCESSOR TO EXECUTE A SPECIAL NON-MASKABLE INTERRUPT |
| RESET | WHEN ACTIVATED, CAUSES PROCESSOR RESET |
| $\phi 1-\phi 4$ | 4 PHASE CLOCK |

Microprocessor 9900 receives interrupt requests from PLC unit 19, AIM unit 21 and Image register 17, as well as timer 43 and data selector 52 which are part of CPU 18. These interrupt requests are stored in interrupt request register 45 and prioritized by priority encoder 44. Priority encoder 44 provides a priority request signal to the interrupt request INTREQ terminal and a corresponding priority code to terminals IC1–IC3 of micoprocessor 9900. The IC1–IC3 terminals are sampled during an interrupt request to determine if the request has high enough priority to be accepted for interrupt.

Timer 43 controlled by ITINTREN and ITCEN flag signals from output data selector 52 provides a 100 millisecond timer for PLC unit 19 and a two millisecond timer which is available to microprocessor 9900. When the two millisecond time has elapsed timer 43 provides an interrupt signal to interrupt register 45.

Microprocessor 9900 has access to central memory unit 20 via data bus CMUD00–CMUD15. It also has access to AIM unit 21 via this same data bus and access to UART/PMEN unit 16 via data bus MB00–MB15. Central memory unit 20 and AIM unit 21 are addressed via address bus CMUA00–CMUA14 while UART/PMEM unit 16 is addressed via address bus MA00–MA14, both being coupled to the A0–A14 address terminals of microprocessor 9900. Memory control is provided by external memory I/O control logic 47. A central memory or AIM request is provided via NAND gate 48 when a MEMEN signal is present along with a selected decoding of the A0 and A1 address bits from microprocessor 9900 to generate a CMU99RQST flag signal to central memory unit 20. The DBIN flag signal derived from the DBIN terminal of microprocessor 9900 indicates whether the request is a memory read or memory write operation. When the central memory unit 20 is ready, a READY flag signal is provided via NOR gate 46 to memory logic 47 which in turn provides a READY flag signal to READY terminal of microprocessor 9900.

Microprocessor 9900 also controls UART/PMEM unit 16 by means of memory control logic 47. Memory requests to UART/PMEM unit 16 are made from the memory enable flag signal MEMEN. The BWE write-enable flag signal and the DBIN data-bus-in flag signal transferred from the WE and DBIN terminals of microprocessor 9900, respectively control whether the memory operation is a read or write. When UART/PMEM unit 16 is ready for data transfer, the UART READY flag signal provided to memory control logic 47 via NOR gate 46, causes memory control logic 47 to generate a READY flag signal to the READY terminal of microprocessor 9900. Serial data and single bit flag signals are input via the CRUIN terminal of microprocessor 9900. The flags, include status flags from image register unit 17 and 9514 PLC unit 19 as well as a parity bit CMUPE. The particular flag to be tested selected by input data selector 49 in accordance with the states of address terminals A12–A14 as decoded by address decoder 55. Serial data IROUT is transferred one bit at a time from image register unit 17 via transfer gate 50. Transfer gate 50 is enabled and input data selector 49 disabled by a decoding of address bits A3 and A4 by address decoder 56.

Serial data is output from the CRUOUT terminal of microprocessor 9900 as well as single bit status flags. Serial data is transferred one bit at a time from the CROUT terminal of microprocessor 9900 to image register unit 17 via buffer gate 51. Output flags utilized for controlling the operation of PLC 19, image register unit 17, timer 43 and an interrupt request 6 are also provided at the CRUOUT terminal of microprocessor 9900. A single bit flag is provided from CRUOUT to one of the selected flag signal lines by means of output data selector 52 which selects the flag line according to a decoding of address lines A10–A14 by means of address decoders 53 and 54. Microprocessor 9900 provides a read write clock signal IR9900R/W for reading or writing data from image register 17 by decoding the signal generated at the CRUCLK clock terminal of microprocessor 9900 and the A3 and A4 address bits by means of address decoder 57.

Referring to FIG. 3b, 9514 programmable logic unit 19 is shown in detail. PLC unit 19 is comprised of a modified TMS9900 microprocessor, the TMS9514, also manufactured and sold as a standard product by Texas Instruments Incorporated, assignor of the present invention. The TMS 9514 is structurally identical to the 9900 with the exception that the control program stored in the control ROM of the microprocessor controls the microprocessor to operate in the manner henceforth to be described in detail herein. The input/output terminals of microprocessor 9514 are as set forth in Table I.

Referring to FIG. 3b then, microprocessor 9514 is illustrated. The prioritized interrupts are not utilized and are hence not shown. Programmable logic control unit 19 basically operates in a continuous scan mode, scanning through the instruction set provided by the user and controlling the controlled process through image register unit 17 and hence I/O unit 22.

Microprocessor 9514 has access to central memory unit 20 via data bus CMUD00–CMUD15. At least some of central memory is commonly accessible by CPU 18 and PLC unit 19 thereby providing one communication link between the two microprocessors. Central memory unit 20 is addressed via address bus CMUA02–CMUA14 coupled to the address terminals A0–A14 of microprocessor 9514. Memory requests are made via the PMEMEN memory enable flag signal. PDBIN flag controls the data-bus-in and read/write control of central memory unit 20. When central memory unit 20 is ready to read or write data from microprocessor 9514 the PREADY flag is set to indicate this to the READY terminal of microprocessor 9514 thereby enabling the memory transfer. A PHOLD flag from output data selector 52 of CPU 18 indicates that microprocessor 9900 has control of central memory unit 20 and the Image Register 17. When microprocessor unit 9514 has control of memory, this is indicated by the PHOLDA flag signal provided to microprocessor 9900 via input data selector 49.

Serial data IROUT from image register unit 17 and bit flags are provided to the CRUIN terminal of microprocessor 9514 by multiplexer 32a. Multiplexer 32a is controlled by the decoding of several bits of the instructions transferred to microprocessor 9514 via data bus CMUD00–CMUD15. The decoding is performed by partial instruction decoder logic 40. Image register data IROUT is input to the CRUIN terminal of microprocessor 9514 via exclusive OR gate 31 and multiplexer 32a one bit at a time. A 100 millisecond pulse provided by timer 43 to timer logic 30 provides an OKTOTM bit flag to CRUIN input selected by multiplexer 32a. The OKTOTM flag indicates to microprocessor 9514 that a 100 millisecond time delay HMSC has expired. In addition, flip flop 33 is set at the end of each scan providing an end-of-scan flag signal EOS which is also selectively input to the CRUIN terminal of microprocessor 9514 via multiplexer 32a. An OK-to-scan flag signal OKTOSCN applied by microprocessor 9900 to the clear input of flip flop 33 indicates to microprocessor 9514 that it can begin rescanning the user process control instruction set.

The end of scan flag signal EOS is also applied to image register unit 17 to indicate to image register unit 17 that EOS data may be transferred between image register unit 17 and IO unit 22. The end-of-scan flag signal is derived from the CRUCLK terminal of microprocessor 9514 via NOR gate 42. The output from the CRUCLK terminal is demultiplexed in accordance with a decoding of selected bits of the instruction on data bus CMUD00–CMUD15 thereby transfering the CRUCLK clocked output to end-of-scan flip flop 33 as discussed above, providing an image register access request flag IR9514ST to image register unit 17, or providing a special function request flag in flip flop 34 to indicate to microprocessor 9900 that the 9514 is requesting the 9900 to perform a special function subroutine for it.

Basically, a special function is one which, because of the limited programming available in the on-chip control ROM of the 9514 microprocessor, is executed by the 9900 microprocessor which has access to complex arithmetic and statistical subroutines stored in the ROM (or RAM) of UART/PMEM unit 16. Special functions will be described in detail in a later section of this application. When microprocessor 9900 has completed queuing-up of the special function requested by microprocessor 9514, microprocessor 9900 provides a PLOADST interrupt signal to the LOAD unprioritized interrupt terminal of microprocessor 9514 via flip flop 36. A PLOADST interrupt signal also resets special function request flip flop 34 via AND gate 35.

As discussed above, serial data IROUT is transferred from image register unit 17 to microprocessor 9514 via exclusive OR gate 31 and multiplexer 32a. When instruction decoder 40 indicates that serial data is to be received from instruction register unit 17, multiplexer 32a is controlled to allow the bits received to be input to the CRUIN terminal of microprocessors 9514. Serial data is output from microprocessor 9514 via the CRUOUT output terminal thereof. The transfer of output data PRIDOT to image register unit 17 is controlled by AND gate 37 and NAND gate 38 in accordance with a partial address decode by NOR gate 39 and decoder 40. The output as well as the input data is transferred one bit at a time to or from image register unit 17 in accordance with the bit location address PA03–PA14 provided at address terminals A03–A14 of microprocessor 9514.

Also included in the PLC unit 19 is parity logic circuit 41 which checks the parity of data transferred via data bus CMUD00–CMUD15. The parity check is enabled by the CMUPEEN flag from output data selector 52 of CPU 18 and the parity bit CMUPE is provided to CPU 18 via input data selector 49.

Image register unit 17 is next described in detail with reference to 3c. It is of an advantage for a programmable logic controller to have all inputs latched up for some period of time so that an input may not change in this period of time. This is the basic function of image register 73 operating in conjunction with I/O module 12. Such function is described in U.S. Pat. No. 3,953,834 referenced above. Imager register 73 is broken up into three distinct areas:

the first is a 256 bit segment used for all 256 allowable inputs; the second is a 512 bit segment assigned to the control flags (CR's); and, the last 256 bit segment is provided for control of all 256 allowable outputs. These three areas fit into a 1k × 1 random access memory (RAM), or, as will later be discussed with respect to the special function feature, 1024 bits of a 4k memory.

The random access memory comprising image register 73 is addressed by a CPU address MA05–MA14 or a PLC unit address PA05–PA14 depending upon the outputs of AND gates 65a and 65b which are responsive to flag signals 9514 RESET, SOP, PHOLDA, OKTOIO and EOS provided by CPU 18 and PLC unit 19. PLC unit 19 may ordinarily access Image register 73 unless placed in a hold condition by PHOLD from CPU 18. PLC unit 19 acknowledges the PHOLD flag signal by providing the PHOLDA flag signal which allows CPU 18 to access image register 73.

Image register unit 17, which is external to PLC unit 19, is the source and destination of most all 9514 microprocessor communications register I/O operations. The 1024 bit page used for storing the input, output and CR flag bits, or the 3072 bits utilized for the special function, are selected by data selector 67a and 67b via OR gate 69a and 69b from flag signals provided by PCU 18 (IRPAGE1, IRPAGE0) and from PLC19 (PA03, PA04). Data selectors 67a and 67b are controlled by IRASB and the image register decrement signal PSIRDCD from microprocessor 9514. Image register 73 is controlled to read or write data according to the read/write control signal IR9514ST or IR9900W/R applied by PLC unit 19 or CPU 18, respectively to the read/write control terminal W of image register 73 via AND gate 71. At the end of each scan of PLC unit 19, if it is okay to input/output (OK to I/O) according to the output of AND gates 65a and 65b, data is transferred in serial fashion between image register 17 and the communications register comprising I/O unit 22. The data is clocked by I/O clock 68 when the IOLATCH flag is set by AND gate 65b via NOT gate 70. The data is transferred from the Q terminal of random access image register memory 73 via NOT gate 74 and NOR gate 75 (OTDAIN). INDATA is transferred from I/O unit 22 to image register unit 17 via multiplexer 66 to the D data terminal of random access image register memory 73.

When image register 17 is not in a I/O mode, data is transferred into image register 73 from CPU 18 (CRUOUT) or from PLC unit 19 (PIRDOT) via multiplexer 66, as selected by AND gates 65a and 65b, to the D data terminal of image register 73. Data is output from image register 73 from the Q terminal (IROUT) to PLC unit 19 and CPU 18 which both have access to data on the IROUT line.

In addition, image register unit 17 includes magnitude comparator 64 which compares the ten bit address from PLC 19 PA05–PA14 and ten bits of data on data bus CMUD03–CMUD14 which is stored in register 63. Magnitude comparator 64 generates a PFLO flag signal when the magnitudes are equal.

Referring to FIG. 3d, central memory unit 20 is illustrated in detail. Central memory unit 20 is comprised of integrated circuit random access memories which are organized to provide four pages 61a–61d, selectable in accordance with address bits CMUA02–CMUA06 by CMU control unit 60. The selected page is addressable by CMUA05–CMUA14 address bits to input or output a 16 bit word on data bus CMUD00–CMUD15 available to both CPU 18 and PLC unit 19. Access request to central memory unit 20 by CPU 18 is made by CPU 18 setting the request flag bit CMU99RQST and by PLC unit 19 is made by PLC 19 setting the request flag bit PMEMEN. CPU 18 controls memory operations as read or write operations by setting the DBIN data-bus-in flag bit and PLC unit 19 controls memory operations as read or write operations by setting the PDBIN flag bit. DBIN and PDBIN are gated by CPU control circuit 60 to provide a read/write control signal CMUW/R to the write enable terminals W of random access memories 61a–61d.

As previously discussed, AIM unit 21 is addressed as an extension of central memory unit 20. Accordingly, AIM unit 21 is addressed if an address on address bus CMUA02–CMUA14 is one of the addresses dedicated to a socket location of AIM unit 21. Data is read into or out of AIM unit 21 via data bus AIMD00–AIMD15. In such instance, CMU control unit 60 provides an AIMDBIN and AIMWE read/write enable control signals which control AIM unit 21 as will later be discussed in detail.

CMU control unit 60 contains a priority circuit which will next be discussed in detail with respect to FIG. 4. The priority circuit receives the requests CUM99RQST and PMEMEN from CPU 18 and PLC unit 19, respectively, and resolves all simultaneous or phased accesses of units 18 and 19 to central memory unit 20. CPU 18 is given access to central memory by CMU control unit 60 providing a CMUREADY flag signal to the READY input of microprocessor 9900 via memory I/O logic control 47 and an address bus enable signal CMU9-9AEN to the address bus from CPU 18. PLC unit 19 is given access to central memory for data transfer when CMU control unit 60 provides a PREADY flag signal to the READY input of microprocessor 9514 and an address bus enable signal CMU95AEN to the address bus from PLC unit 19.

Figure 4:
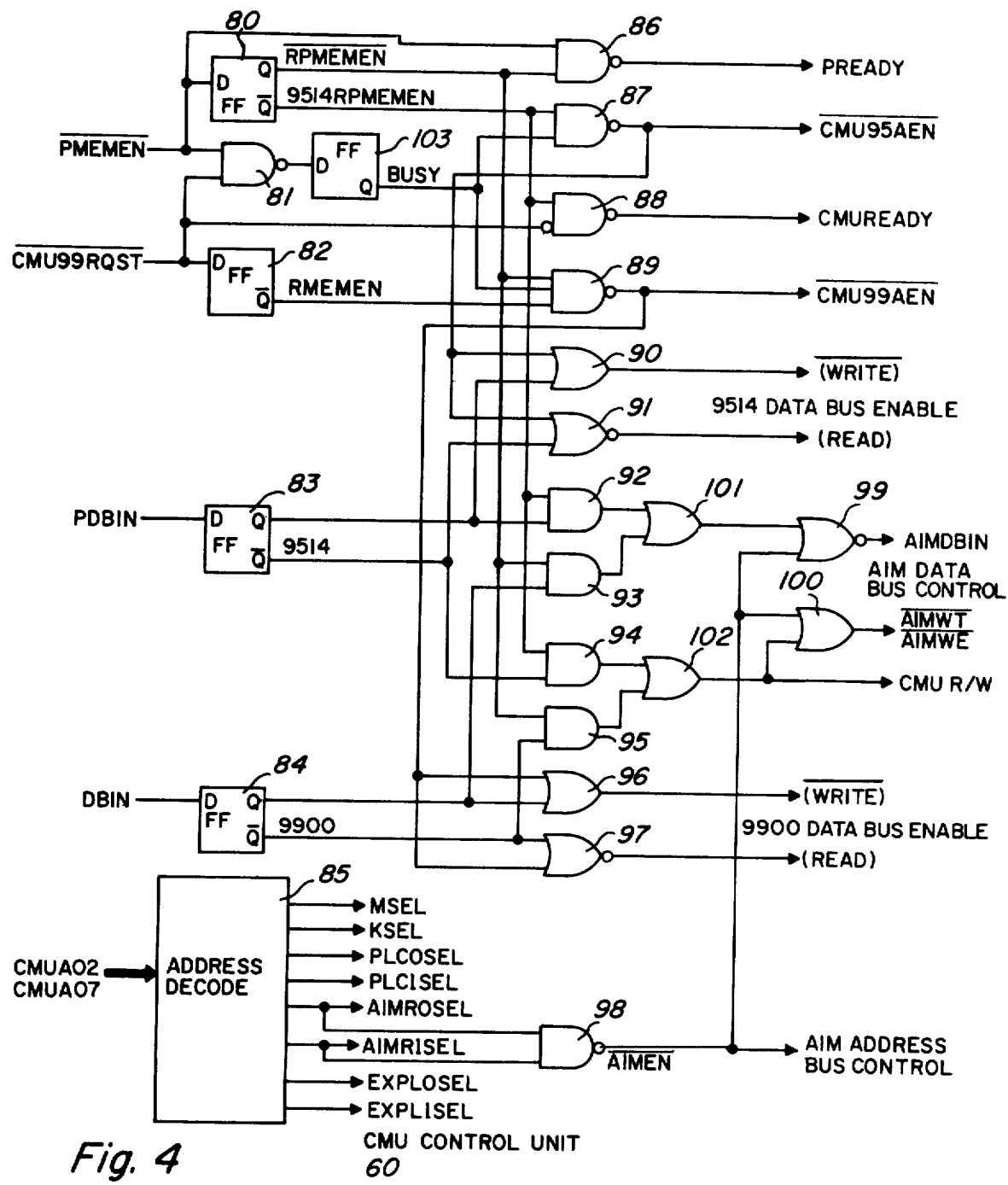
FIG. 4 is a logic circuit diagram of the memory control unit of the central memory unit of FIG. 3d.

Referring then to FIG. 4, the page selection circuit and priority circuit of CMU control unit 60 is next described in detail. Address decoder 85 receives address bits CMUA02–CMUA07 from either CPU 18 or PLC unit 19 according to the enable signals CMU99AEN and CMU95AEN. In accordance with these address bits, address decoder 85 selects one of four pages 61a–61d of memory 20 or one of two pages of AIM unit 21 by providing selection signals MSEL, KSEL, PLC0SEL, PLC1SEL, AIMR0SEL or AIMR1SEL. If either of the AIM unit selection signals SIMR0SEL or AIMR1SEL are present, as detected by NAND gate 98, AIMDBIN and AIMWE read/write enable signals are generated along with AIM data bus control signals from NOR gate 99 and OR gate 100 and AIM address bus control signals from NAND gate 98.

Memory Access requests from PLC unit 19 (PMEMEN) are stored in flip flop 80 and memory access requests from CPU 18 (CMU99RQST) are stored in flip flop 82. In the present embodiment, memory requests by PLC unit 19 are always given priority over simultaneous or later received requests from CPU 18. If memory unit 20 is not already engaged in a memory request, a memory request by either CPU 19 or PLC unit 19 provides a logic 1 output from NAND gate 81 which is stored in busy flip flop 103 indicating that the memory is busy. The output of flip flop 103 causes either CMU9-5AEN or CMU99AEN address bus enable signals to be output from NAND gate 87 or 89, respectively, thereby enabling the respective address bus from PLC unit 19 or CPU 18. If a memory request is received from PLC unit 19, NAND gate 86 provides ready flag signal PREADY to PLC unit 19 as indicated in Example I of Table II below.

TABLE II

|  | EXAMPLE I | | EXAMPLE II | | EXAMPLE III | |
| --- | --- | --- | --- | --- | --- | --- |
|  | t0 | t1 | t0 | t1 | t0 | t1 |
| PMEMEN | active(0) | active(0) | inactive(1) | inactive(1) | active(0) | active(0) |
| CMU99RQST | inactive(1) | inactive(1) | active(0) | active(0) | active(0) | active(0) |
| PREADY |  | active(1) |  | inactive(0) |  | active(1) |
| CMUREADY |  | inactive(1) |  | active(0) |  | inactive(1) |
| CMUREADY |  | inactive(0) |  | active(1) |  | inactive(0) |
| CMU95AEN |  | active(0) |  | inactive(1) |  | active(0) |
| CMU99AEN |  | inactive(1) |  | active(0) |  | inactive(1) |

When PMEMEN and CMU99RQST are both inactive, CMUREADY remains active. As indicated in Example II of Table II, if the memory request is from CPU 18, NAND gate 88 provides an active ready flag signal CMUREADY to CPU 18, so long as a PLC unit request is not pending (as indicated by the 9514RPMENEN output of flip flop 80). Simultaneous memory requests by both PLC unit 19 and CPU 18 are, as controlled by the logic circuit of the present embodiment, always decided in favor giving access to PLC unit 19 as indicated in Example III of Table II. This occurs because the output of flip flop 80 and the PMEMEN signal cause NAND gate 86 to provide an active PREADY signal, while causing the CMUREADY output of NAND gate 88 to be inactive.

In addition to the address bus enable signals CMU95AEN and CMU99AEN, CMU control unit 60 provides enable signals for the respective data buses. Flip flop 83 stores a data-bus-in flag signal DBIN from CPU 18. These flag signals indicate to control unit 60 whether the memory operation is a read or write. When the PLC unit 19 address bus is enabled, as indicated by an active CMU95AEN enable signal provided by NAND gate 87, a 9514 data bus write-enable-signal is provided by OR gate 90 or a 9514 data bus read-enable-signal is provided by NOR gate 91, depending upon the state of flip flop 83. When the CPU 18 address bus is enabled, as indicated by an active CMU99AEN enable signal provided by NAND gate 89, a 9900 data bus write-enable-signal is provided by OR gate 96 or a 9900 data bus read-enable-signal is provided by OR gate 97, depending upon the state of flip flop 84. If the request is a request for access to AIM unit 21, AND gates 92-95 and OR gates 101 and 102 provide AIM control signals AIMDBIN and AIMWE, as previously discussed, in accordance with the states of flip flops 83 and 84.

As described above, CMU control unit 60 resolves simultaneous memory requests in favor of PLC unit 19. It is contemplated that in another embodiment of the system, simultaneous memory requests may be resolved in favor of CPU 18. This is accomplished utilizing the same circuit by reversing the PMEMEN and CMU99RQST request input flags to the circuit of FIG. 4 and reversing the respective output control signals PREADY and CMUREADY as well as the respective data and address bus enable signals.

As previously discussed, UART/PMEM unit 16 provides read only memory (ROM), random access memory (RAM) and universal asynchronous data interfaces (ACIA) for CPU 18. UART/PEM unit 16 will next be described in detail with respect to FIG. 3e. Referring then to FIG. 3e, UART/PEM unit 16 is coupled to CPU 18 by data bus MB00-MB15 and address bus MA00-MA14. Address bits MA00-MA04 are received by ACIA and RAM control logic 77a and address bits MA00-MA03 are reached by ROM control logic 77b. ACIA and RAM control logic 77a also receives control flags, WAIT, MEMEN and DBIN from CPU 18 and ROM control logic 77b receives control flag MEMEN from CPU 18.

The address bits MA00-MA04 are utilized by control logic 77a to select RAM 72 (PRAMEN) or one of the asynchronous data interface circuits 78a or 78b (ACIAEN and ACIASEL); aternatively, the address bits MA00-MA03 are used by control logic 77b to select one of six ROM pages 79a-79f. The BWE read/write control signal provided by CPU 18 controls whether the access to RAM 72 is a read or write operation and DBIN control is input/output control of circuits 78a and 78b. Data is input and output from RAM 72 as 8 bit words transferred to CPU 18 over data bus MB08-MB15. Asynchronous serial data is input to or output from universal asynchronous serial data interface circuits 78a and 78b. Eight bits of parallel data is transferred over bus MB08-MB15 between CPU 18 and interface circuits 78a and 78b. Circuits 78a and 78b are clocked by flip flop 77e controlled by phase PH3 of the clock signal. Data and instructions are read from the addressed ROM as 16 bit words which are transferred to CPU 18 over data bus MB0-MB15.

CPU 18 and PLC 19 are controlled by a four phase clock PH1-PH4 generated by the clock circuit illustrated in FIG. 3f. Selective of the phases PH1-PH4 are also utilized for controlling image resister unit 17, central memory unit 20 and UART/PMEM unit 16 which comprise sequencer module 10. In addition, clocking signals are available to AIM I/O system 11, I/O module 12, and other modules which are connectable to sequencer module 10 for synchronization of these units with sequencer module 10.

Referring to FIG. 3f, the four phase clock generator is comprised of a count-to-four counter 76 which receives clocking signal f of selected frequency and divides it into the four phases PH1-PH4.

Figure 5:
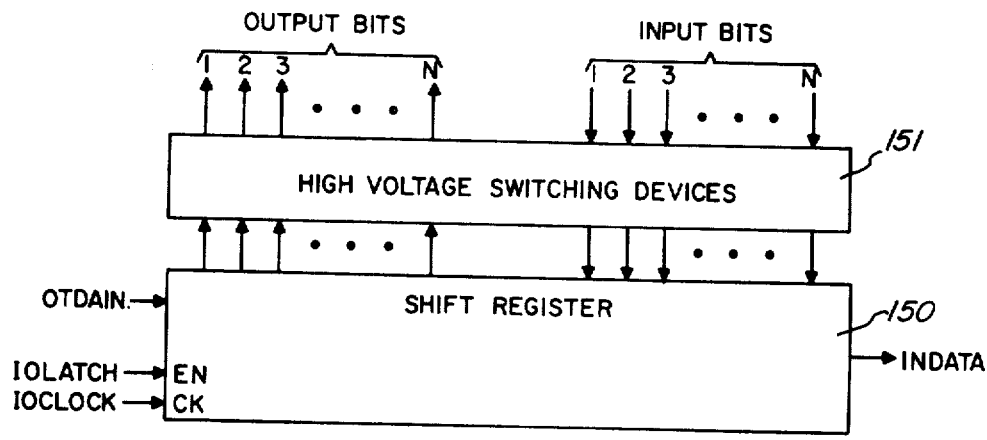
FIG. 5 is a logic circuit diagram of the I/O module of FIG. 1.

Referring to FIG. 5, a logic diagram of input output module 12 is illustrated. The details of I/O module 12 are shown and described in the above referenced U.S. Pat. No. 3,953,834. Basically, input bits from various sensors located along the process being controlled are received as on-off signals by high voltage switching devices 151 to provide input bits 1—N which are transferred in parallel to shift register 150. Output data bits 1—N are provided in parallel by shift register 150 to a series of high voltage switching devices 151 for controlling the various controller devices located along the process being controlled. In addition, shift register 150, acts as a communication register to provide single bit control flags (CR's). All of these bits, 256 allowable input bits, 256 allowable output bits and 512 communication register control flags are transferred from image register unit 17 (OTDAIN) and transferred from shift register 150 to image register unit 17 (INDATA) in serial fashion as controlled by the IOCLOCK clock during an input/output cycle. In normal operation, PLC 19 unit is utilized to provide the 1−N output bits and is the recipiant of the 1−N input bits, while both PLC unit 19 and CPU 18 provide and utilize the communication register control flags CR's via image register unit 17.

Figure 6D:
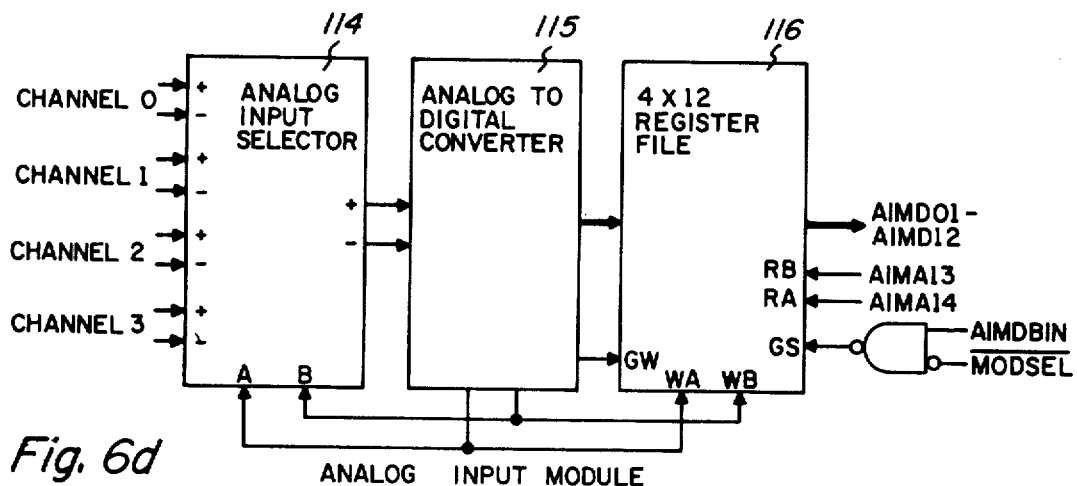

PLC unit 19 and CPU unit 18 also both have access to AIM unit 21. AIM unit 21 will next be described in detail with respect to FIG. 6a–6e. As previously discussed AIM unit 21 is addressed as an extension of central memory unit 20. Referring to FIG. 6a, if AIM unit 20 is accessed, as indicated by AIMDBIN and AIMWE, address bits AIMA07–AIMA09 are decoded by selector circuit 106 to select one of eight plug-in-sockets 105a–105h respectively selected by output signals MODSEL0–MODSEL7. Each of sockets 105a–105h is connected to a common address bus AIMA10–AIMA14 and a common data bus AIMD-00–AIMD15. Into each of these sockets may be plugged any combinaion of a parallel digital data output module, a parallel digital data input module, an analog input module or an analog output module.

The parallel output module is illustrated in detail in FIG. 6b. Basically, the parallel output module is comprised of 16 bit data register 107 which is controlled by an active AIMWE enable signal in conjunction with selection of the socket MODSEL by one of the eight module selection signals MODSEL0–MODSEL7. The active write enable signal AIMWE causes 16 bits of data contained on the AIM data bus AIMD-00–AIMD15 to be stored in 16 bit data register 107. The data stored in data register 107 are provided as 16 parallel data bits D00–D15 at the Q output of data register 107.

A parallel input module is illustrated in detail in FIG. 6c. Basically, the parallel input module is controlled by an active AIMDBIN enable signal in combination with selection of the socket into which the parallel input module is plugged by the respective selection signal MODSEL0–MODSEL7. When enabled, the parallel input module stores 16 parallel input bits D00–D15 in 16 bit data register 108 and provides these 16 bits at the Q output of data register 108 to be read on AIM data bus AIMD00–AIMD15.

Each analog input module, as illustrated in 6d, has four channels Channel 0–Channel 3 each of which receive a variable analog voltage. Analog input selector 114 selects each channel, in turn, and converts it to a 12 bit digital number which is stored in a respective 12 word register of four word by 12 bit register file 116. The digital signals from the four channels may then be read out over AIM data bus AIMD01–AIMD12 as controlled by an active AIMDBIN enable signal in conjunction with selection of the plug in module by the respective selection signal MODSEL0–MODSEL7. In reading data from file 116, channel selection is provided by AIM address bits AIMA13 and AIMA14.

Figure 6E:
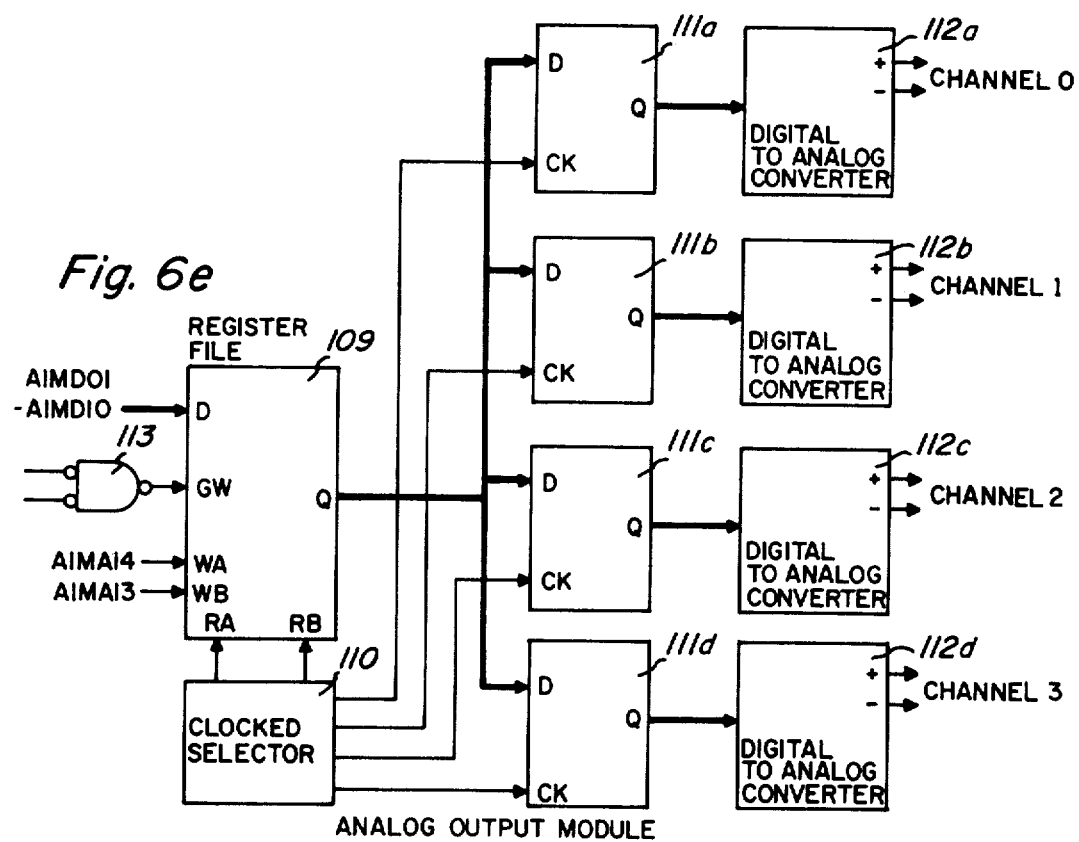

The analog output modules are as illustrated in FIG. 6e. The analog output modules provide four variable analog voltage output channels, Channel 0–Channel 3. Ten bits of digital data corresponding to each of these channels is stored in a respective word of a four word by 10 bit register file 109. The ten bits are read in over AIM data bus AIMD01–AIMD10 and stored in the register word selected by AIM address bits AIMA13 and AIMA14 when the module enabled by an AIMWE enable signal in conjunction with selection of the module by the respective selection signal MODSEL-0–MODSEL7 from selector 106 via NAND gate 113. The four words of register file 109, corresponding to the four channels Channel 0–Channel 3, are read out in sequence as controlled by clock selector 110 and stored in a respective 10 digit data register 111a–111d. The ten bit digital words stored in registers 111a–111b are then separately converted by digital to analog converters 112a–112d, respectively, into analog voltages Channel 0–Channel 3.

Figure 7:
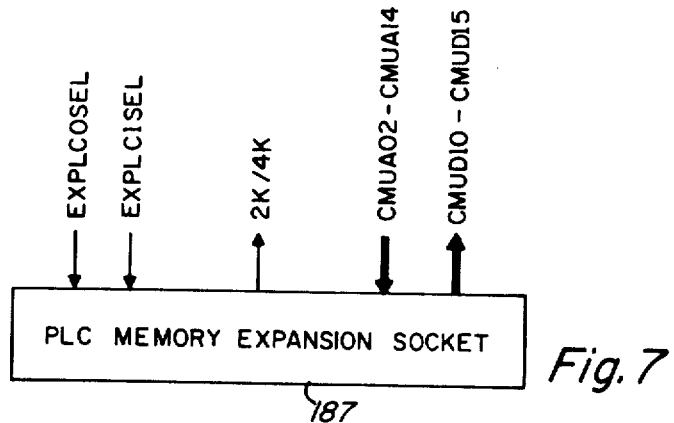
FIG. 7 is a diagram of the PLC memory expansion socket.

As previously mentioned, the user process control program is stored in central memory unit 20. In the present embodiment, central memory unit 20 is organized as 4096 words of 16 bits. Referring again to FIG. 3d, each 1024 word page 61a–61d of memory unit 20 is dedicated to a specific use. The first M area or page provides 1024 words of RAM for use by both microprocessor the second K area can be either 1024 words of RAM or ROM memory, for use by both microprocessors, the third PLC0 area, which can be either 1024 words of RAM or ROM is dedicated to user program storage and the PLC1 area, which can also be either 1024 words of RAM or ROM is dedicated to user program storage. These memory areas are selected by the page select signals KSEL, MSEL, PLC0SEL, and PLC1SEL, respectively. In addition to the 2048 words of PLC user program area in central memory unit 20, an additional 2048 words of expansion memory may be added to the basic system. The expansion memory may either be RAM or ROM memory which is plugged into memory expansion board socket 187 illustrated in FIG. 7. The expansion memory, which comprises two 1024-word pages, are selected by the the EXPLC0SEL and EXPLC1SEL page selection signals.

In accordance with a unique feature of the present system, the presence or absence of the expansion memory board in socket 187 is detected by the 2K/4K line connected to socket 186.

Referring again to FIG. 3b, when the state of the 2K/4K indicates that only 2K of memory is present (socket 187 unused) and address bits A2 and A3 indicate that the addressed PLC program word exceeds the 2048 dedicated user program words contained in central memory unit 20, an end of scan EOS signal is generated by AND logic circuit 186. AND logic circuit 186 may be comprised of an AND gate, a plurality of logic gates providing an AND function or a selector circuit which selects the 2K/4K signal to provide the end of scan signal EOS whenever it is indicated by the A2/A3 address bits. In this manner, whenever a memory expansion board is absent from socket 187, an end of scan signal is automatically generated after the 2048 step of the user program. With a memory expansion board plugged into socket 187, the scanning process may proceed through 4096 steps of a user program.

As previously discussed, microprocessor 9514 comprising PLC unit 19 of FIG. 3b is basically a 9900-type microprocessor which has had the control program stored in its internal control ROM modified to cause the microprocessor to function as a programmable logic controller rather than a general purpose microprocessor. The operation of microprocessor 9514 and PLC unit 19 will next be described in detail.

PLC unit 19 is a boolean processor that performs most of its operations and makes most of its decisions on a central bit designated the "power flow bit" PF. Power flow bit PF is analagous to the accumulator that provides the central register of a multibit processor. Any output of the programmable logic controller is from the PF, any input goes to the PF and all logic operations involve the PF.

A push down stack (PDS) is utilized to save previous values of PF when, for example, a series of functions are performed during a boolean operation. Push down stacks are described in detail in above referenced U.S. Pat. No. 3,953,834. The PF and push down stack are implemented by microprocessor 9514 in its internal RAM.

Figure 3C:
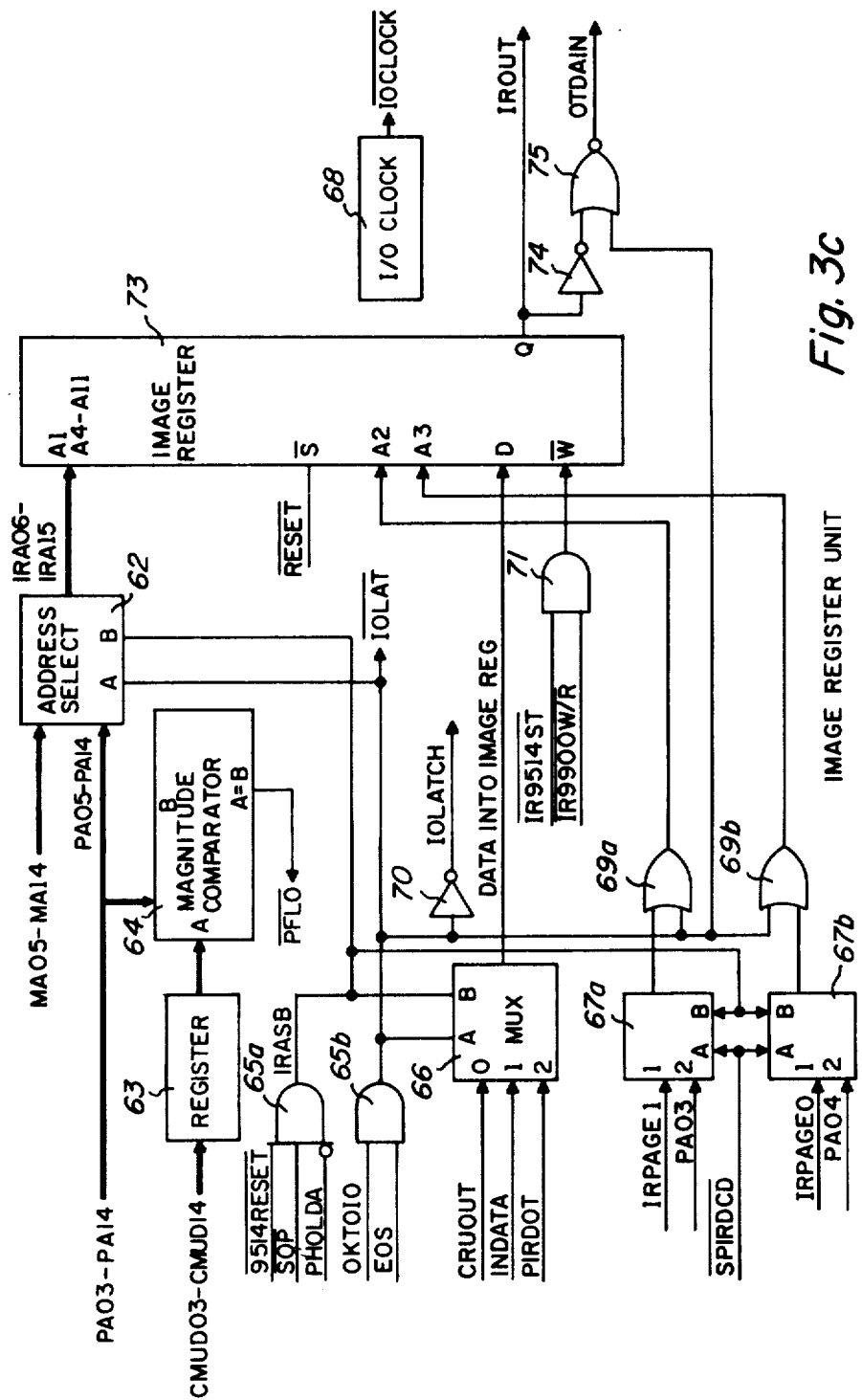
Figure 3E:
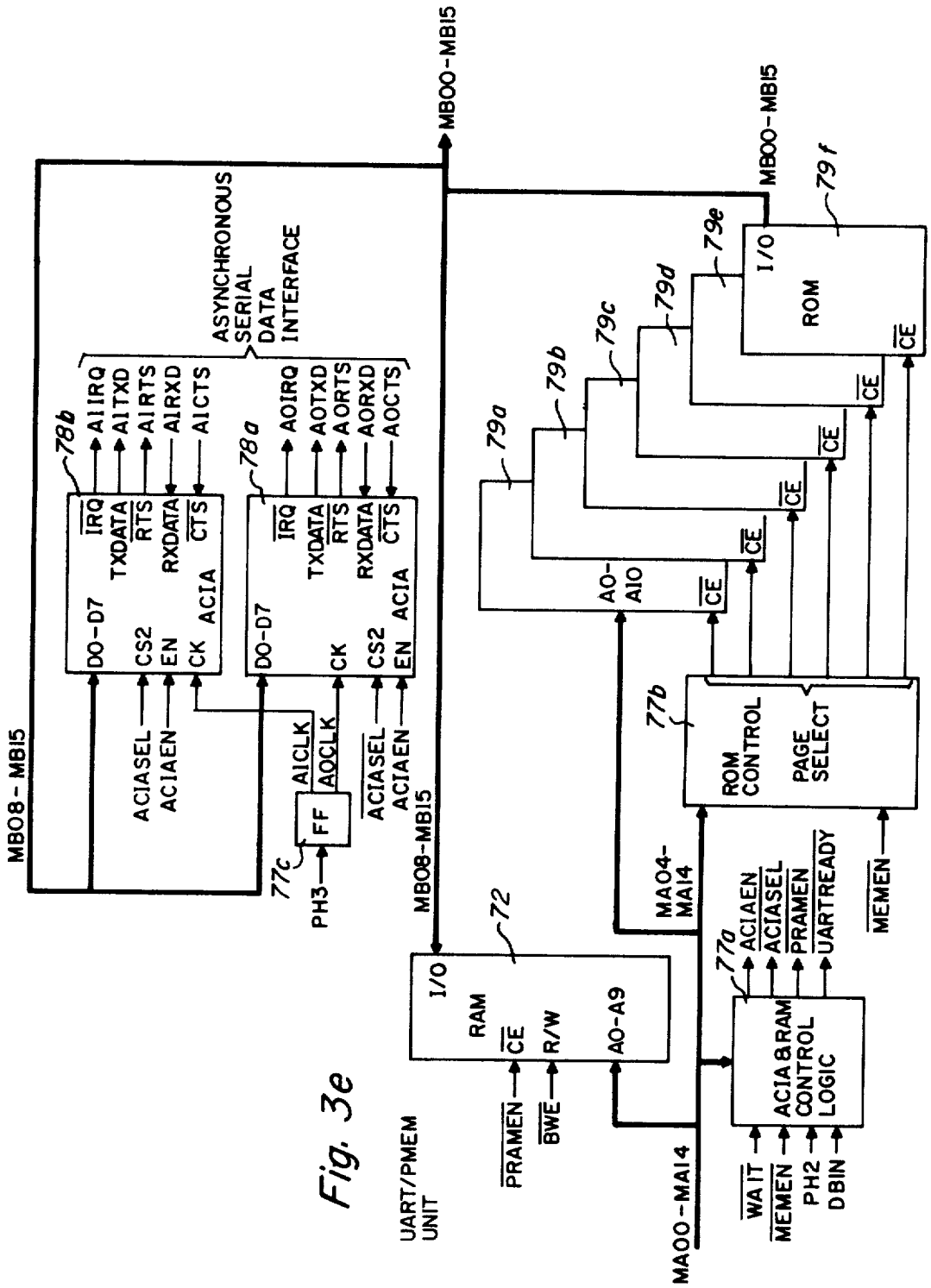

As previously discussed with respect to FIG. 3c, instruction register 72 comprising instruction register unit 17 is the source/destination of most all communications register CRU operations of microprocessor 9514. Also as previously discussed, the instruction register is divided into four segments or fields which, for the purpose of discussing user program instructions, are designated as follows: "X" 256 input bits, "CR" and "CRL" each 256 communication register bit flags and "Y" 256 output bits.

Microprocessor 9514 responds to four distinct classes of highly specialized user program instructions, and nearly all involve PF in some manner. The first class is of a type which involves PF and the instruction register IR. AND, OR, OUT, and STR fall into this first class. The second class involves PF and PDS1 is the top bit in the push down stack next to the PF bit). OR STR, OR STR NOT, AND STR, and AND STR NOT comprise this class. In executing each instruction of the second class, PDS1 is destroyed (stack popped) and PF takes on the defined logic result. The third class is comprised of two instructions that modify the output instructions. MCR (master control relay) and JMP (jump over output) are these two instructions. The fourth class involves word operations these include timer, counter, add, subtract, move, compare arithmetically, SF and end of scan.

The modified control ROM program of microprocessor 9514 redefines the internal RAM of microprocessor 9514 such that T1 is a temporary register, PF and PDS are assigned to one of the 15-bit internal RAM words and the "number of successive outputs to be modified" is assigned to another 15-bit internal RAM word.

The operations of microprocessor 9514 are described in detail in Table III below.

TABLE III

| | TMS 9514 INSTRUCTION SET | |
|---|---|---|
| 16-BIT INSTRUCTION CODE | MNEUMONIC | OPERATION |
| 0010 11YY XXXX XXXX | STR | Stores contents of PF register in $PDS_1$ (first bit of the push down stack) PDS "pushes" down one bit. An addressed operand bit in the image register IR (YY XXXX XXXX defines the image register address) is transferred one the PF register. |
| 0011 00YY XXXX XXXX | STR NOT | Stores contents of PF register in $PDS_1$ as PDS "pushes" down one bit. The complement of the addressed operand bit from the image register is transferred to the PF register. |
| 0100 00YY XXXX XXXX | OR | The operand bit addressed in the image register is logically "ORed" with the contents of the PF register and the resultant bit replaces the PF register contents. |
| 0101 00YY XXXX XXXX | OR NOT | The operand bit addressed in the image register IR is inverted and then logically "ORed" with the contents of the PF register. The resultant bit replaces the PF register contents. |
| 0010 10YY XXXX XXXX | AND | The operand bit addressed in the IR is logically "ANDed" with the contents of the PF register and the resultant bit replaces the PF register contents. |
| 0001 01YY XXXX XXXX | OUT | If neither a JMP or MCR is active, the contents of the PF register is placed into the addressed bit location of the IR. The PF register remains unchanged. If a JMP is active, nothing is done to the selected output, but the count of successive outputs to be jumped over is decremented. |

TABLE III-continued

TMS 9514 INSTRUCTION SET

| 16-BIT INSTRUCTION CODE | MNEUMONIC | OPERATION |
|---|---|---|
| | | PF in the PDS remains unchanged; however, PF that is presented to the PF Indicator takes on the state of the output bit that was addressed in the IR. If an MCR is active, the IR bit addressed by the modifier is set to zero; then, the count of successive output instructions requiring an MCR operation is decremented. PF in the PDS remains unchanged, but PF as presented to the PF indicator is always 0. JMP and MCR are mutually exclusive within the range of the modifier; that is, they may never be active simultaneously. A JMP or MCR requested within the range of a previous JMP or MCR is treated as a NOP. |
| 0011 10YY XXXX XXXX | OUT NOT | The compliment of PF is placed into the addressed bit location of the image register. The PF register remains unchanged. If JMP or MCR is active, see above. MCR on OUT NOT does not place a "1" in the IR. |
| 0000 0010 0010 0000 | OR STR | Logically OR the contents of the PF register with the contents of $PDS_1$ and the PDS is "popped" up one bit. The resultant bit replaces the contents of the PF register. |
| 0000 0010 0110 0000 | AND STR | The contents of the PF register is logically "ANDed" with the contents of $PDS_1$ and the PDS is "popped" up on bit. The resultant bit replaces the contents of the PF register. |
| 0000 0010 1100 0000 | EOSu | Execute "End of Scan". The PC, PDS, JMCR and SCCE registers are set to zero. The 9514 is held in RESET until the I/O cycle is complete and/or the 9900 allows the 9514 to restart scan. |
| 1000 00XX XXXX XXXX | JMP | If PF=0 and neither a JMP nor MCR is presently active, put 10-bit modifier (XX XXXX XXXX) in JMCR counter (# of successive outputs to be skipped) and set the JMP ACTIVE flag (SCCE=1); otherwise, JMP functions as NOP. In all cases, PF and PDS are left undisturbed. |
| 0010 00XX XXXX XXXX | MCR | IF PF=0 and neither a JMP nor MCR is presently active, the 10-bit modifier is placed in the JMCR counter (# of successive outputs to be zeroed) and set the MCR flag (SCCE=0); otherwise, MCR functions as NOP. In all cases, PF and the PDS are left undisturbed. |
| 0000 0011 1010 0000 | TMR | The timer is a 3-word instruction that is a function of PF, $PDS_1$ and OK to time. PRESET word is static CURRENT word counts down |

TABLE III-continued

TMS 9514 INSTRUCTION SET

| 16-BIT INSTRUCTION CODE | MNEUMONIC | OPERATION |
|---|---|---|
| | | from PRESET word. PF is the reset which, when zero, forces the CURRENT word to the PRESET value. $PDS_1$ is the event to be timed. Time is accumulated when $PDS_1=1$. The OK to time register indicates when 100 mS has been accumulated, at which point the current word may be decremented. PF is set to one when the CURRENT word equals zero. The present system accumulates approximately 54 minutes. Maximum for one timer. |
| 0000 0011 1000 0000<br>2nd Word: PRESET Word Address<br>3rd Word: CURRENT Word Address | CTR | The counter instruction is a function of three variables: PF, $PDS_1$ and $PDS_2$. PF is the reset variable; i.e., when PF=0 the current word is set to zero. If PF=1, the CTR will increment the current word if the event to be counted has occurred since the last scan. The event represents the closure of a switch or relay, or a 0 to 1 transition of the $PDS_1$. Each time the 9514 encounters a CTR instruction, the state of $PDS_1$ is stored as a bit in the image register to be compared with $PDS_1$ on the next scan. Thus, state transitions are detected. PF is set to 1 when the counter current word equals its preset value; otherwise, it is a zero. |
| 0000 0010 1110 0000<br>2nd Word: ADDER Address<br>3rd word: ADDEND Address<br>4th word: SUM Address | ADD | If PF=1, perform the addition and store the sum at the address given. The ADD instruction handles signed integer numbers, and PF is set to zero if the intended sum is greater than +32,767 or less than −32,768. If PF=0, ADD is a NOP. |
| 0000 0011 0000 0000<br>2nd Word: MINUEND Address<br>3rd Word: SUBTRAHEND Address<br>4th Word: DIFFERENCE Address | SUB | If PF=1, perform the subtraction and store the difference at the address given. The SUB instruction handles signed integer numbers, and PF is set to zero if the intended difference is greater than +32,767 or less than −32,768. If PF=0, SUB is a NOP. |
| 0000 0010 1010 0000<br>2nd Word: SOURCE Address<br>3rd Word: DESTINATION Address | MOC | If PF=1, the contents at the SOURCE address is duplicated in the DESTINATION address; otherwise, MOV is a NOP. PF remains unchanged. |
| 0000 0011 0110 0000 | CMP | The compare instruction makes its comparison with two's complement subtract, and is divided into two types of compare depending on PF. If PF=0, an equality test is performed. PF takes on the value of the equality test; i.e., if A=B, PF=1. If PF=1, a $\leq$ test is performed, and if A $\leq$ B, PF=1; otherwise PF=0 |
| 0000 0011 0100 0000 | SF | The Special Function instruction is used to ex- |

TABLE III-continued

TMS 9514 INSTRUCTION SET

| 16-BIT INSTRUCTION CODE | MNEUMONIC | OPERATION |
|---|---|---|
|  |  | pand the realm of the PLC instruction set. When an operation beyond the scope of the 9514 is required, the Special Function passes this request along to the 9900. The Special Function employs three bits to work asynchronously with the 9900. Two of these bits are stored externally and are accessible to both the 9900 and the 9514. The Q bit indicates the status of the request within the 9900 task queue. The Busy bit (BZ) is used to determine when the operation is complete. The third bit is PFI used once again as the reset line to terminate the Special Function request. The 9514 has no direct means of setting or resetting the Q and BZ bits; this is handled by the 9900. The 9514 reads the bits to determine its proper course of action. When PFI=1 and the task is not queued up (Q=0), the 9514 interrupts the 9900 and goes into an idle mode. The 9900 must restart the 9514 after the request. If the task is queued up (Q=1), the 9514 tests the BZ bit. If BZ=1, the 9900 has not completed the request and PFO is set to zero. When BZ=0, the task is complete and PFO is set to 1. The reset path (PFI=0) always sets PFO=0. The Q bit is tested to see if action has yet been taken to remove the request from the task queue. If Q=1, the 9900 is interrupted to request that the task be dropped from the queue. IQ=0, no action is taken. |
| 0000 0010 1000 0000 | EOSc | If PF=1, End of Scan is executed according to the $EOS_u$ instruction. If PF=0, the instructions as a NOP. |

Some examples of user control programs follow:

(1) Sequential logic—Output Y1 of I/O module 10 is turned on when switches X1 and X2 are closed; remains on until switch connected to X5 is opened.

| Program |
|---|
| STR X1 |
| AND X2 |
| OR Y1 |
| AND NOT X5 |
| OUT Y1 |

(2) Timers—X1 and X2 are closed; output Y5 turns on after a timed period which is determined by the value stored in memory location C33.

| Program |
|---|
| STR X1 |
| STR X2 |
| TMR |
| C33 |
| V13 |
| OUT Y5 |

(3) Math—After X10 closed, the value stored in location V13 is added to the value stored in location C3; the result is stored in V21.

| Program |
|---|
| STR X10 |
| + |
| V13 |

-continued

| Program |
|---|
| C3 |
| V21 |
| OUT CR 30 |

As indicated above, the present intelligent programmable process control system is capable of executing special functions which are arithmetic or other complex subroutines beyond the capability of microprocessor 9514. When, during execution of a user control program, microprocessor 9514 of PLC unit 19 encounters a special function instruction, generally of the form SFi (where i is an integer which identifies the requested special instruction interrupt flag SOP indicating to CPU 18 that the special function should be queued-up and the appropriate subroutine executed by microprocessor 9900. Microprocessor 9514 then goes into an idle state. The subroutine is contained in the 9900 microprocessor ROM or RAM of UART/PMEM unit 16.

The SOP interrupt flag signal to CPU 18 is prioritized; accordingly, the interrupt is not executed by microprocessor 9900 until microprocessor 9900 reaches a point in its processing at which the special function interrupt can be handled. When microprocessor 9900 accepts the special function interrupt, microprocessor 9900 determines the precise point in the user control program at which the 9514 microprocessor reached the special function instruction. This is determined by the contents of the 9514 micrprocessor's internal program counter which is provided as the 9514 microprocessor address output PA00-PA14. The PA00-PA14 address is compared to addresses in magnitude comparator 64 of image register unit 17 until the program counter address is deferred. Once the 9900 microprocessor has determined the address of the special function instruction which caused microprocessor 9514 to generate the SOP interrupt signals, the 9900 microprocessor determines what subroutine must be executed and queues-up such subroutine in its task queue. The ADDRESS, shown as the second word of the special function instruction, is a matter of communication between microprocessor 9900, microprocessor 9514 and R/W programmer 15.

Two single bit flag registers are reserved in the 3072 bits of the special function pages of the 4K image register for each possible address at which a special function instruction may be encountered in the instruction sequence processed by PLC unit 19. These two bits are utilized for transmitting messages regarding the status of special function request and execution: (1) the Queue bit flag which is set by microprocessor 9900 to indicate that the 9900 microprocessor has received the requested special function interrupt and placed the special function subroutine in its task queue and (2) the BUSY bit flag which is set by microprocessor 9900 to indicate that it is "busy" and has not yet completed execution of the requested special function subroutine.

Once microprocessor 9900 has queued-up the special function subroutine and set the QUEUE and BUSY flag bits in the image register, CPU 18 generates an interrupt signal PLOADST to the unprioritized LOAD interrupt input of microprocessor 9514 to restart microprocessor 9514. Microprocessor 9514 then continues in its sequential exection of the user control program from the point at which it left off, even though microprocessor 9900 has not yet completed execution of the special function subroutine.

Each time the 9514 microprocessor encounters the same special function instruction in its instruction sequence if PF is active, it first checks the QUEUE bit flag to determine whether or not it has already, in a previous scan of the user control program, sent an interrupt signal requesting the special function be queued-up. If the QUEUE bit is "1", this indicates that the special function is already in the 9900 microprocessor queue while if the QUEUE bit is "0", this indicates that the special function is not in the 9900 microprocessor queue and an interrupt signal SOP must be sent to microprocessor 9900 to queue-up the special function.

Once it is determined that the special function request is in the 9900 microprocessor queue (QUEUE="1") the 9514 microprocessor checks the BUSY flag bit to determine whether the 9900 microprocessor has completed execution of the requested special function subroutine. If the BUSY bit flag is set to "1", this indicates that the 9900 microprocessor has not completed execution of the requested special function subroutine; if the BUSY bit flag is set to "0", this indicates that execution of the requested special function subroutine is complete and the 9514 microprocessor may obtain the results of the computation or subroutine execution from the preselected memory locations of central memory unit 20.

Microprocessor 9514 may terminate a previously requested special function. In order to accomplish this, the 9514 microprocessor first determines from the QUEUE bit flag that the special function instruction is in the 9900 microprocessor queue (QUEUE="1"). An SOP interrupt flag signal sent by microprocessor 9514 to microprocessor 9900 at this point (while QUEUE="1") terminates the special function request in the 9900 microprocessor and the QUEUE bit flag is reset accordingly.

Some examples of a special function in user control programs are as follows:

(1) BINARY TO BCD CONVERSION—After X20 closes, the special function #1 (Binary to BCD Conversion) is Queued up for execution. CR10 is energized upon completion;

| Program |
|---|
| STR X20 |
| SF1 |
| V125 |
| OUT CR10 |

(2) BINARY TO BCD CONVERSION—SF1 stored in location V125, converts the Binary Number stored in location V21 to BCD and energizes the BCD display connected to AIM unit 21 Module A01.

| Program |
|---|
| CLR |
| V125 SF1 |
| V21 |
| A01 |
| CR511 |

Analog feedback control loops are implemented by execution of instructions in microprocessor 9900. The loop control equations are provided for the user in ROM 74a-74f of UART/PNEM unit 16 as preprogrammed subroutines. The user is required only to key in, via read write programmer 15, the parameters listed in TABLE IV, and enable the loop from the PLC logic control provided.

Figure 8:
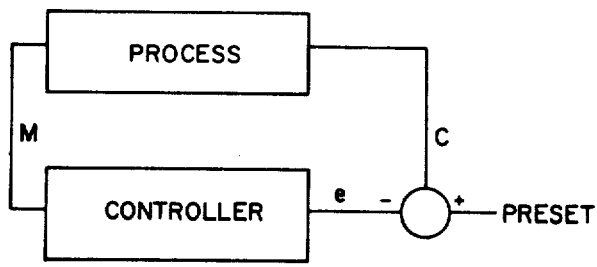
FIG. 8 is a diagram of the general form of an analog control loop.

The present system provides for controlling up to eight loops of the general form illustrated in FIG. 8.

Control loops featuring proportional only, proportional plus integral, proportional plus integral plus derivative, proportional plus derivative, and ratio are provided.

Control is implemented as integro-differential equations of the form $$M = \frac{100}{P}\left( e + \frac{1}{R} \int e\, dt + \frac{de}{dt} \right)$$

Since the 9900 microprocessor system is a digital processor, and calculates a new value of output (m) for a given loop only once each cycle (sampling period defined by parameter #14), it does not solve differential equations. Instead, the above differential equation is solved by a digital algorithm which is a difference equation. The corresponding difference equation is $$m = \frac{100}{P}\left( e + \frac{1}{R} \sum_{o}^{\eta} e\Delta t + D\left(\frac{e\eta - e\eta_1}{\Delta t}\right) \right)$$

The subscript $\eta$ designates the present value of the indicated variable, while $\eta - 1$ is its value at the time of the last previous sample.

TABLE IV

LOOP CONTROL PARAMETER ARRAY

| PARAMETER # | PARAMETER | |
|---|---|---|
| 1 | LOOP ENABLE/DISABLE | Used by PLC logic to enable or disable a given loop. |
| 2 | LOOP TYPE IDENTIFIER | Proportional (P), Proportional plus Reset (PE), Proportional plus Reset plus Derivative (PID), Proportional plus Derivative PD, or Ratio. |
| 3 | PROPORTIONALITY BAND (%) | A constant between 2 and 2000%. This is the P term in the integro-differential equation. |
| 4 | RESET TIME | Reset time from 0.01 to 100 min. It is the R term in the equation of the integro-differential equation. |
| 5 | DERIVATIVE TIME | Derivative time ranges from 0.01 to 1100 min. It is the D term in the integro-differential equation. |
| 6 | ADDRESS OF INPUT | Address of the location in memory where the process input variable is stored. Analog inputs and outputs for the system are 4 to 20 ma. An input, for example, of 4 ma. would be converted by the A/D converter to a binary number. It is this number which is used in calculations, etc. The REP panel displays in units of the process. A 4-ma input may represent 50 psi, where 20 ma represents 250 psi. The REP panel will display the numbers 50 and 250 as the signal extremes. |
| 7 | 4 ma EQUIVALENT DEFINITION INPUT | The user specifies the numbers for |

TABLE IV-continued
LOOP CONTROL PARAMETER ARRAY

| PARAMETER # | PARAMETER | |
|---|---|---|
| 8 | 20 ma EQUIVALENT DEFINITION | conversion to display parameter in units of the process. The parameter may be displayed as a percentage by entering 0 for the 4-ma equivalent and 100 for the 20-ma equivalent. |
| 9 | ADDRESS OF OUTPUT | Address of the location in memory where the process output variable is stored. |
| 10 | 4-ma EQUIVALENT DEFINITION | The user specifies the numbers for |
| 11 | OUTPUT 20-ma EQUIVALENT DEFINTION | conversion to display parameter in units of the process. The parameter may be displayed as a percentage by entering 0 for the 4-ma equivalent and 100 for the 20-ma equivalent. |
| 12 | INTEGRAL RESIDUE STORAGE | The basic loop control equation involving reset (integral) function involves an infinite summation to solve the integral. It takes the form 1/R(e dt) where R is the reset time. The parameter e is the difference between process variable input (addressed by parameter #6) and the setpoint (parameter #13). |
| 13 | SETPOINT | The process set point. |
| 14 | SAMPLING INTERVAL, COUNT DOWN CELL | The sampling interval represents or controls Δt in the difference equation. It is in units of half seconds, and different update rates may be used for each loop, with no loop being updated more frequently than every half second. |
| 15 | HIGH/LOW RED CAUTION LIMITS | Tell how far from the setpoint the |
| 16 | HIGH/LOW ORANGE CAUTION LIMITS | process variable input deviates before panel lights give warning. |
| 17 | GREEN BAND LIMITS | This limit specifies a + and − band about the setpoint within which the process variable input minus the setpoint can drift before the orange or red caution warning light turns on. |
| 18 | HIGH ALARM LIMIT | (See #21) |
| 19 | LOW ALARM LIMIT | (See #21) |
| 20 | INCREASE/DECREASE DIRECTION SWITCH | Depending on the user process, the |

TABLE IV-continued
LOOP CONTROL PARAMETER ARRAY

| PARAMETER # | PARAMETER | |
|---|---|---|
| | | output variable needs to increase for increasing error term. In other processes, the output should decrease when the error increases. This parameter allows the user to specify increase-decrease for each loop. |
| 21 | ADDRESS OF REFERENCE VARIABLE FOR HIGH/LOW ALARM | The high alarm (parameter #18) and low alarm (parameter #19) limits can be specified as separate values; and can be referenced to any memory location. The reference could be specified as an input variable, output variable, or a constant in memory. |
| 22 | OUTPUT BIAS | Proportional only control follows the equation $M = \frac{100}{p}(e) + b$ Where b is the bias term Hence this term is included to handle the case where a loop is called upon to act as a proportional only or PD controller. |
| 23 | RATIO ADJUSTMENT COEFFICIENT | This parameter is used only with RATIO control. |
| 24 | ADDRESS OF RATIO "CONTROLLED" VARIABLE | |
| 25 | ADDRESS OF RATIO "CONTROLLING" VARIABLE | |
| 26 | PREVIOUS ERROR VALUE | |

The loops are set up and turned through the loop array. The user enters appropriate data into the loop array prior to enabling the loop.

Proportionally only control (P) affects control through the equation:

$$M = \frac{100}{p}\left(e + \frac{1}{R}\int e\,dt\right)$$

The user selects PI control by selecting the loop type indentifier word for the desired loop on read write programmer panel 15 and depressing the PI key.

Proportional plus integral plus derivative (PID) control is implemented using the equation:

$$M = \frac{100}{P}\left(e + \frac{1}{R}\int e\,dt + D\frac{de}{dt}\right)$$

Where
P = proportionality band,
e = difference between process variable and setpoint,
D = Derivative time,
P is parameter 3,
R is parameter 4
D is parameter 5
dt is parameter 14

Placing the PID code into parameter #2 by the programmer causes the select loop to act as a PID controller.

Proportional Plus Derivative (PD) control affects control via the equation:

$$M = \frac{100}{p}\left(e + D\frac{de}{dt}\right) + b$$

where b is the proportional bias term.

PD Mode control is selected through the programmer as in P, PI, and PID.

With ratio control, the controlled variable is based on the ratio of two measured variables. One of these two variables, say X or Y, is the controlled variable, while the other is used to generate the set point. If X were the controlled variable, then the set point would be calculated as KY where K is an adjustable coefficient listed in the loop control parameter array (parameter #23). In this case, the difference between the set point and the "process variable" is e+KY−x and the final equation solved is $$M = \frac{100}{P}(Ky - x) + b$$

Ratio control is set up through the read write programmer 15 in a manner similar to the other loop control modes.

The system provides for automatic programmed control of up to eight loops. The user must indicate to the sequencer to perform as a proportional only loop and loop #3 to act as a full PID loop. The loop parameters in TABLE IV must be entered by the user via read write programmer panel 15 before he sets a loop into operation.

Some parameters define the equation for the loop. Others relate to how the analog inputs and outputs will be handled. Still others specify limits of operation for the indicator lights.

The user can, in his control program, enable or disable a given loop by using the MOV instruction to place a non-zero number into this location to enable the loop, and a zero to disable it. This gives the user the ability to conditionally enable or disable loops. For example:

When X1 is closed, the first line moves a non-zero constant, stored in location M1, into location M2 (which is the enable disable word of this array), thus enabling the loop.

In like manner, when X1 opens, the bottom line moves a zero value from location M3 into the enable/disable word, disabling the loop.

Two loops can be cascaded by the system logic control. The user can specify, via parameter #6 (address of input) in the loop array, the output of one loop as the input of another loop.

An example of 3 Mode Control is as follows: 3 Mode temperature control loop controls steam valve connected to AIM an analog output A0200. Temperature setpoint comes from thumbwheel switches connected to AIM parallel input module A0300. Temperature measurement comes from temperature transmitter connected to AIM analog input module A0100.

| R/W programmer is: Prompting message | Program |
|---|---|
| Ready | |
| Loop No. = | Loop 1 |
| Sample Rate = | 5 |
| Loop Flags→ | Yes |
| Loop Flags: | CR10 |
| PV ADR: | A0L00 |
| SPADR: | A0300 |
| Out ADR: | A0200 |
| Gain (%%) = | 3.2 |
| Reset (min) = | 50 |
| Rate (Min) = | 10 |
| High Alarm = | 200 |
| End of Loop | |
| | STR CR10 |
| | OUT Y10 |

The system incorporating the novel features of the present invention have now been described in detail. Since it is apparent that these details may be modified without departing from the nature and spirit of the invention, the invention is not to be limited to said details except as set forth in appended claims.

What is claimed is:

1. An intelligent programmable process control system for controlling a process, said system comprising:
    (a) at least one analog-to-digital converter means for generating a digital output corresponding to an analog voltage input signal from an analog sensor device located along said process;
    (b) at least one digital-to-analog converter means for generating an analog voltage output signal corresponding to a digital input to control a controllable analog device located along said process;
    (c) digital processor means coupled to the digital output of said analog-to-digital converter means and coupled to provide the digital input to said digital-to-analog converter means, said digital processor means controlling at least one analog loop control function of said process via said analog-to-digital converter means and said digital-to-analog converter means;
    (d) boolean processor means for scanning and executing a sequence of boolean logic functions;
    (e) image register means for storing input bits representative of the on/of states of sensors located along said process and output bits representative of the on/off states of controllable devices located along said process, said boolean processor means being coupled to said image register means for executing said sequence of boolean logic functions in accordance with the states of said input bits to generate said output bits;
    (f) selectively addressable memory means; and communication means including a direct path and a path through selectable addresses of said selectively addressable memory means coupling said digital processor means to said boolean processor means to communicate instructions and data between said digital processor means and said boolean means, said digital processor means and said boolean processor means normally operating independently and asynchronously with respect to each other.

2. The process control system according to claim 1 including means for receiving parallel digital input signals coupled to said digital processor means, said digital processor means controlling said analog loop control function in accordance with digital input data received via said parallel digital input means.

3. The process control system according to claim 2 wherein said boolean processor means is also coupled to said parallel digital input means for controlling the on/off state of said output bits in accordance with digital data received via said parallel digital input means.

4. The process control system according to claim 1 including a parallel digital output means coupled to said digital processor means for providing digital data resulting from computations performed by said digital processor means.

5. A process control system according to claim 1 including communication register means coupled to said image register means for communicating said on/off states from said sensors to said image register means and for communicating said on/off states for said controllable devices from said image register means and wherein said boolean processor means receives and generates single bit communication register flags which are stored in said image register means and transferred via said communication register means and said boolean processor via said image register means.

6. The process control system according to claim 5 wherein said boolean processor means controls said output bits in accordance with the states of said communication register flags.

* * * * *